United States Patent
Lo

(10) Patent No.: US 11,165,718 B2
(45) Date of Patent: Nov. 2, 2021

(54) ASYMMETRICAL ETHERNET PHYSICAL LAYER DEVICE

(71) Applicant: Axonne, Inc., Sunnyvale, CA (US)

(72) Inventor: William Lo, Cupertino, CA (US)

(73) Assignee: Axonne, Inc., Sunnyvale, CA (US)

( * ) Notice: Subject to any disclaimer, the term of this patent is extended or adjusted under 35 U.S.C. 154(b) by 71 days.

(21) Appl. No.: 16/701,976

(22) Filed: Dec. 3, 2019

(65) Prior Publication Data
US 2020/0177522 A1    Jun. 4, 2020

Related U.S. Application Data

(60) Provisional application No. 62/774,623, filed on Dec. 3, 2018, provisional application No. 62/804,310, filed on Feb. 12, 2019.

(51) Int. Cl.
*H04L 12/66*    (2006.01)
*H04L 12/931*    (2013.01)
*H04B 3/50*    (2006.01)

(52) U.S. Cl.
CPC ............ *H04L 49/20* (2013.01); *H04B 3/50* (2013.01); *H04L 49/351* (2013.01)

(58) Field of Classification Search
CPC ..... H04B 3/50; H04L 12/4013; H04L 12/901; H04L 47/10; H04L 47/22; H04L 47/263; H04L 49/20; H04L 49/351; Y02D 30/50
See application file for complete search history.

(56) References Cited

U.S. PATENT DOCUMENTS

| | | | | |
|---|---|---|---|---|
| 7,548,549 B2* | 6/2009 | Bergeron | ............ | H04L 12/2801 370/419 |
| 7,720,068 B2* | 5/2010 | McClellan | .......... | H04L 27/0008 370/391 |
| 2004/0096004 A1* | 5/2004 | Wang | ................ | H04L 25/03885 375/257 |
| 2010/0111081 A1* | 5/2010 | Diab | ..................... | G06F 1/3234 370/389 |
| 2011/0280259 A1* | 11/2011 | Diab | ..................... | H04J 3/0641 370/469 |
| 2014/0359676 A1* | 12/2014 | Diab | .................. | H04N 21/6373 725/80 |

\* cited by examiner

*Primary Examiner* — Frank Duong

(57) ABSTRACT

A physical layer device for transmitting and receiving Ethernet data includes a transmit path including a first transmitter configured to operate at a first speed, communicate with a first medium access controller (MAC), and transmit first Ethernet data from the MAC on a cable. A receive path includes a first receiver configured to operate at a second speed that is different than the first speed, communicate with the first MAC, and receive second Ethernet data from the cable and output the second Ethernet data to the first MAC.

13 Claims, 26 Drawing Sheets

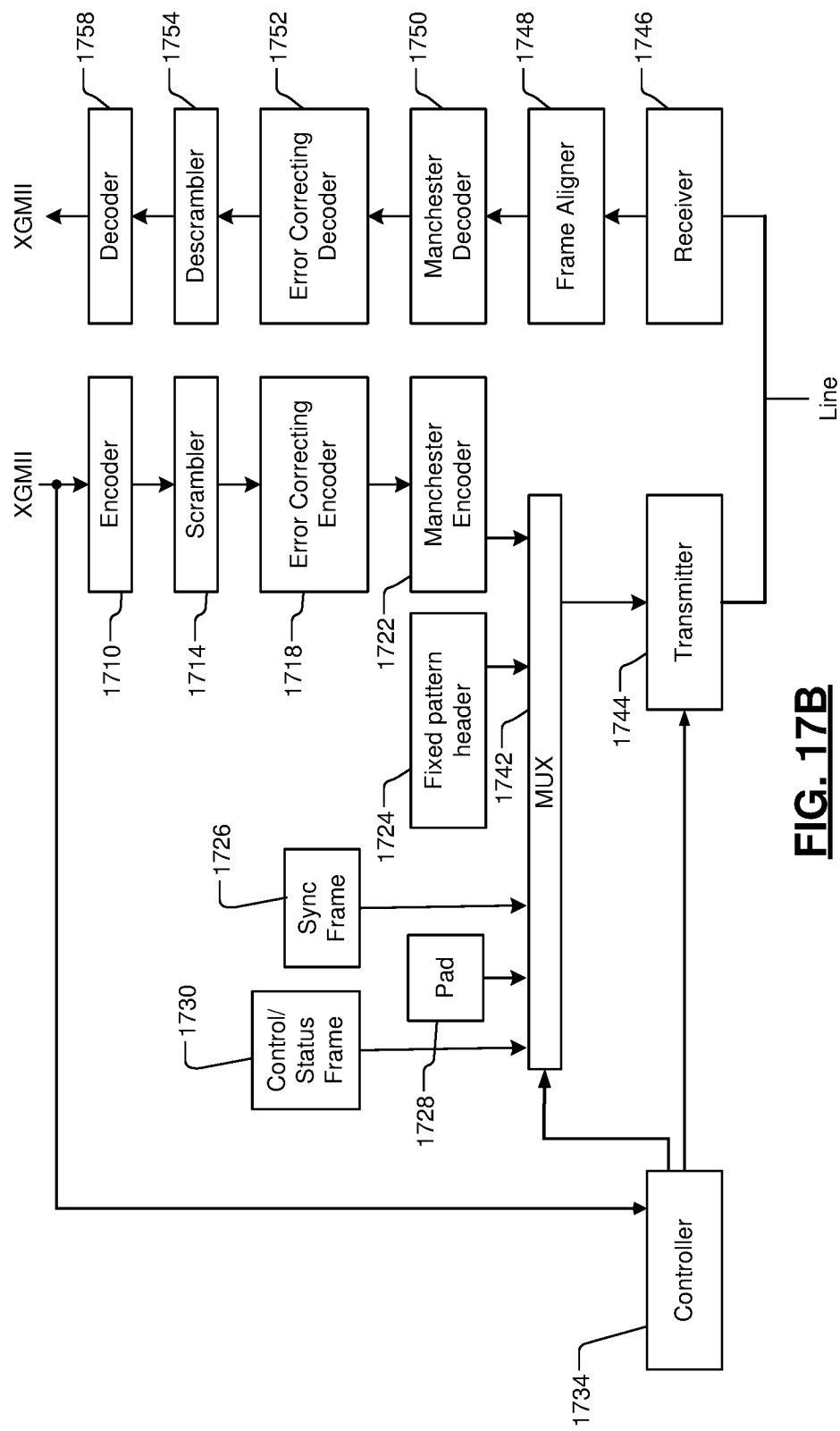

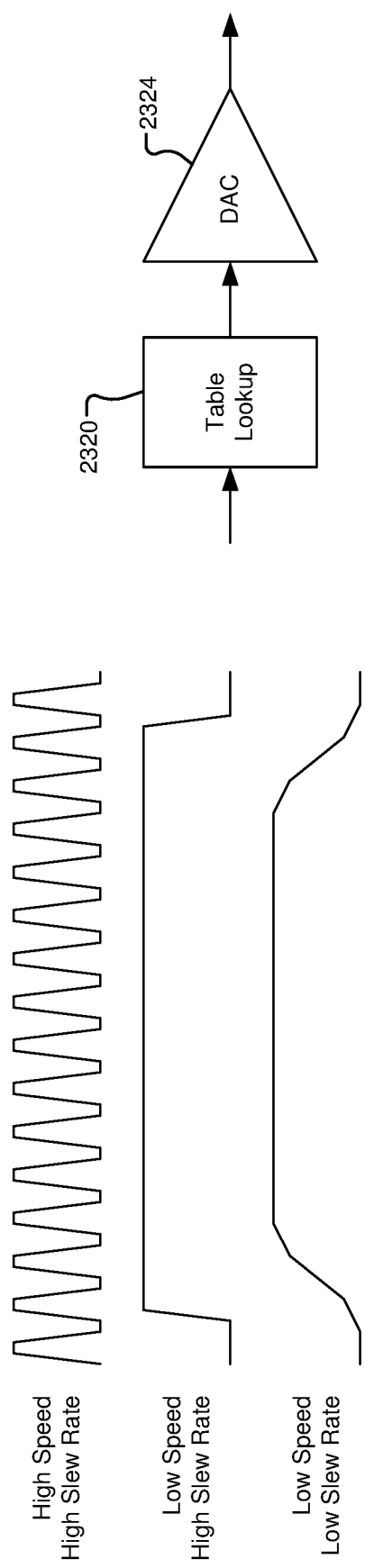
FIG. 23A
FIG. 23B
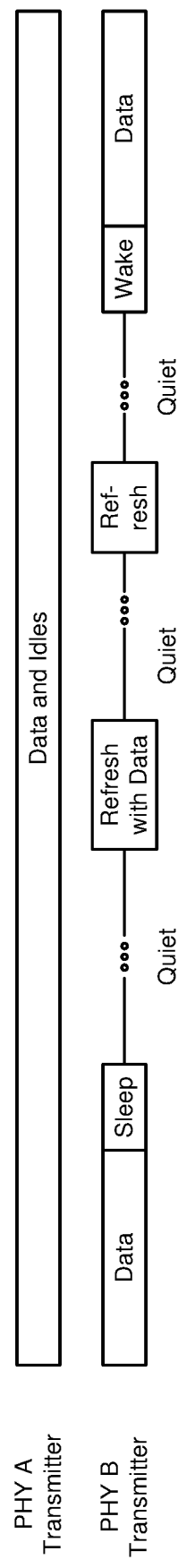
FIG. 24

ASYMMETRICAL ETHERNET PHYSICAL LAYER DEVICE

CROSS-REFERENCE TO RELATED APPLICATIONS

This application claims the benefit of U.S. Provisional Application No. 62/774,623, filed on Dec. 3, 2018 and U.S. Provisional Application No. 62/804,310, filed on Feb. 12, 2019. The entire disclosure of the applications referenced above are incorporated herein by reference.

FIELD

The present disclosure relates to data communication systems, and more particularly to data communication systems including asymmetrical Ethernet physical layer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A computing device such as a computer, tablet, router and/or server typically includes a network interface that transmits and receives data at high speed over a medium such as a cable. The network interface typically includes a medium access controller (MAC) and a physical layer device (PHY). The MAC provides an interface between a host device such as the computer and the PHY provides an interface between the MAC and the medium. The PHY includes a transmitter and a receiver.

The computing device is connected by the network interface and the medium to a network interface of another device such as a router. The router is connected to network interfaces of other devices such as a cable modem, a printer, or other network device. Typically, the communication links between the devices are bidirectional. The network interfaces are configured to support data flows at high speed in both directions.

In other applications, the network interfaces handle data flows that are asymmetric in that they flow at high speed in one direction and at low speed in the opposite direction. For example, vehicles increasing include cameras, sensors and/or other high speed data generating devices that are used for autonomous control systems, driver assist systems, safety systems, etc. The cameras, sensors and/or other devices generate high speed data flows in one direction when they are operational. The high speed data flows are usually transmitted to a controller that is located remotely from the cameras, sensors and/or other high speed data generating devices. However, the controller only needs to transmit low speed data (such as control data) back to the cameras, sensors and/or other high speed data generating devices. Furthermore, the control data is generated infrequently.

The high-speed, bidirectional communication links that have been developed for computing devices are not ideally suited for the asymmetrical communication links found in vehicles. The power consumption and cost of the high-speed, bidirectional communication links are prohibitive in automotive applications where multiple cameras and sensors are used. Furthermore, power consumption of the high-speed, bidirectional communication links is too high for vehicle applications (particularly for electric or hybrid vehicles). In other words, supporting a high speed link from the controller back to the cameras, sensors and/or other high speed data generating devices is inefficient.

SUMMARY

A physical layer device for transmitting and receiving Ethernet data includes a transmit path including a first transmitter configured to operate at a first speed, communicate with a first medium access controller (MAC), and transmit first Ethernet data from the MAC on a cable. A receive path includes a first receiver configured to operate at a second speed that is different than the first speed, communicate with the first MAC, and receive second Ethernet data from the cable and output the second Ethernet data to the first MAC.

In other features, the first speed is greater than or equal to two times the second speed. The first speed is less than or equal to one half of the second speed. The first transmitter is configured to transmit the first Ethernet data in a first frequency range and wherein the first receiver is configured to receive the second Ethernet data in a second frequency range that is different than the first frequency range.

In other features, a first filter configured to pass the first frequency range and connected between the transmit path and the cable. A second filter is configured to pass the second frequency range and connected between the receiver path and the cable. The first filter is selected from a group consisting of a high pass filter and a first band pass filter. The second filter is selected from a group consisting of a low pass filter and a second band pass filter.

A system includes the physical layer device, a low pass filter connected to the cable, and a data generating device connected to the physical layer device and the low pass filter.

A system includes the physical layer device, a low pass filter connected to the cable, and a power supply connected to the low pass filter.

A vehicle communication system includes a data generating device, a first network interface connected to the data generating device and including the physical layer device, a computing device, and a second network interface including a second physical layer device and a second MAC. The cable connects the first network interface and the second network interface.

In other features, the data generating device is selected from a group consisting of a camera and a sensor. The sensor is selected from a group consisting of a LIDAR sensor, an infrared sensor and a radar sensor. The second physical layer device includes a second transmitter configured to operate at the second speed, communicate with the second MAC, and transmit the second Ethernet data from the second MAC on the cable. A second receiver configured to operate at the first speed, communicate with the second MAC, and receive the first Ethernet data from the cable and output the first Ethernet data to the second MAC.

In other features, the cable includes a twisted pair copper cable. The cable includes a coaxial cable. The first receiver includes a clock recovery circuit configured to generate a recovered clock signal and wherein the first transmitter operates based on a ratio times the recovered clock signal, wherein the ratio is equal to the first speed divided by the second speed. One of the ratio or an inverse of the ratio is equal to an integer. The transmit path includes an encoder configured to frame data from the MAC.

In other features, the transmit path further includes an error correcting encoder to encode an output of the encoder. The error correcting encoder comprises a Reed Solomon encoder. The transmit path further includes a Manchester encoder to encode an output of the error correcting encoder.

In other features, the transmit path further includes a fixed pattern generator configured to generate a fixed pattern. A multiplexer is configured to receive an output of the fixed pattern generator and to receive an output of the Manchester encoder. An output of the multiplexer is connected to the first transmitter.

In other features, a scrambler is configured to scramble an output of the encoder. A scrambler is configured to scramble an output of the error correcting encoder. A first multiplexer configured to receive an output of the encoder, training/sync data, and control/status data. An error correcting encoder is configured to perform error correction coding on an output of the first multiplexer. A scrambler is configured to scramble an output of the error correcting encoder. A second multiplexer is configured to receive and output of the scrambler and header/pad data. A Manchester encoder is configured to perform Manchester coding on an output of the second multiplexer.

A network interface for transmitting and receiving Ethernet data includes a medium access controller (MAC) configured to receive first data in a first direction at a first speed and to transmit second data in a second direction at a second speed. A physical layer device is configured to output the first data to the MAC and to receive the second data from the MAC. The first speed is different than the second speed.

In other features, the first speed is greater than or equal to two times the second speed. The first speed is less than or equal to one half of the second speed. The MAC is compliant with IEEE 802.3. A replicating circuit is configured to replicate the first data at the first speed by a ratio of the second speed over the first speed to generate replicated first data at the second speed. A downsampling circuit is configured to receive the replicated first data at the second speed, to downsample the replicated first data to recover and output the first data at the first speed to the MAC.

In other features, first data at the first speed comprises MII data and the second data at the second speed comprises XGMII data. A first serializer is configured to serialize the first data from the PHY to provide first serialized data. A first deserializer is configured to deserialize the first serialized data from the first serializer and to output the first data at the first speed to the MAC. A second serializer is configured to serialize the second data from the MAC to provide second serialized data. A second deserializer is configured to deserialize the second serialized data from the second serializer and to output the second data at the second speed to the PHY.

In other features, the MAC, the first deserializer and the second serializer are implemented as a first integrated circuit. The PHY, the first serializer and the second deserializer are implemented as a second integrated circuit.

In other features, the second serializer and the second deserializer use one of 10GBASE-R, 5GBASE-R, and 2.5GBASE-X. The first serializer and the first deserializer use SGMII in one of 1000 Mb/s, 100 Mb/s, and 10 Mb/s.

A first physical layer device of a network device includes a receiver including a clock recovery circuit to recover a first clock signal from first data received by the receiver from a link partner. A clock multiplier is configured to receive the first clock signal and to multiply the first clock signal by N to generate a second clock signal, where N is an integer greater than one. A transmitter is configured to receive the second clock signal and to transmit second data to the link partner at a frequency determined by the second clock signal.

A communication system includes the first physical layer device. The link partner comprises a second physical layer device including a transmitter to transmit the first data at a frequency determined by the first clock signal and a receiver configured to receive the second data at a frequency determined by the second clock signal.

In other features, the transmitter of the second physical layer device is configured to send idle frames when there is no data to send to maintain timing of the first physical layer device. The transmitter of the second physical layer device is configured to send the idle frames at a predetermined interval when there is no data to send to maintain timing of the first physical layer device.

A first physical layer device of a network device includes a receiver including a clock recovery circuit to recover a first clock signal from first data received by the receiver from a link partner. A clock divider is configured to receive the first clock signal and to divide the first clock signal by N to generate a second clock signal, where N is an integer greater than one. A transmitter is configured to receive the second clock signal and to transmit second data to the link partner at a frequency determined by the second clock signal.

A communication system includes the first physical layer device. The link partner comprises a second physical layer device including a transmitter to transmit the first data at a frequency determined by the first clock signal and a receiver configured to receive the second data at a frequency determined by the second clock signal.

In other features, the transmitter of the second physical layer device is configured to send idle frames when there is no data to send to maintain timing of the first physical layer device. The transmitter of the second physical layer device is configured to send the idle frames at a predetermined interval when there is no data to send to maintain timing of the first physical layer device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 17A illustrates an example of a portion of a continuous stream of data (idles or data) being sent;

FIG. 17B is a functional block diagram of an example of a transmit path and a receive path according to the present disclosure;

FIG. 23A is an example of a slew rate diagram according to the present disclosure;

FIG. 23B is an example of a table lookup and digital to analog converter according to the present disclosure;

FIG. 24 is an example of a data timing diagram with periodic clock refreshing according to the present disclosure;

In the drawings, reference numbers may be reused to identify similar and/or identical elements.

DESCRIPTION

Figure 1:
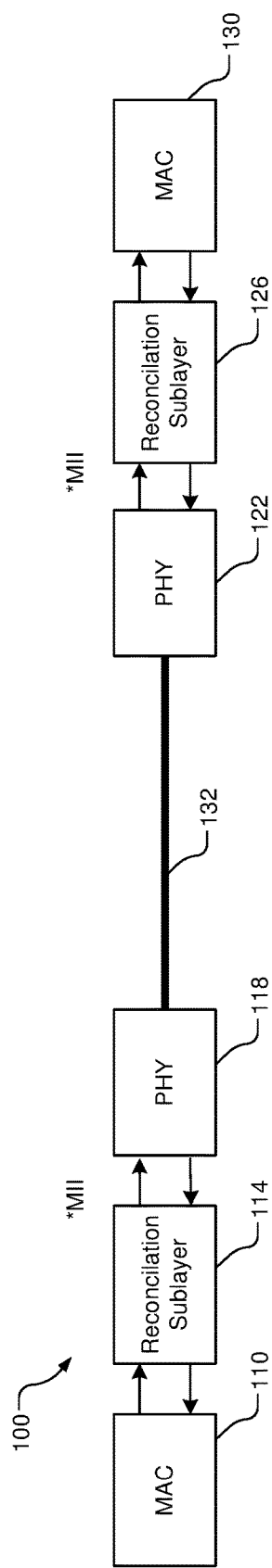
FIG. 1 is a functional block diagram of an example of a link segment.

Referring now to FIG. 1, a link segment 100 of an Ethernet communication system is shown. One end of the link segment 100 includes a medium access control (MAC) device 110, a reconciliation sublayer device 114 and a physical layer device (PHY) 118. An opposite end of the link segment 100 is similar and includes a PHY 122, a reconciliation sublayer device 126 and a MAC device 130. The PHYs 118 and 122 are connected by a medium 132 such as a cable. In some examples, the MAC device 110 can be connected to one device such as a camera or sensor and the MAC device 130 can be connected to a controller.

Ethernet point to point link segments such as the link segment 100 are connected by the medium 132 that is terminated by the PHYs 118 and 122. As a signal is transmitted between the PHYs 118 and 122 over the medium 132, the signal is degraded by both the limited bandwidth of the medium 132 as well as external noise interference. The PHYs 118 and 122 include circuitry to modulate the signal that is output by the transmitters. The PHYs 118 and 122 also include circuitry to reconstruct the degraded signal received by the receiver so that messages can be passed reliably between the two end points on the link segment 100.

The PHYs 118 and 122 traditionally operate with symmetrical speeds in both directions of the link segment 100. As transmission speed increases, power dissipation and the number of transistors needed to implement the PHYs 118 and 122 increases, which increases cost.

Figure 2:
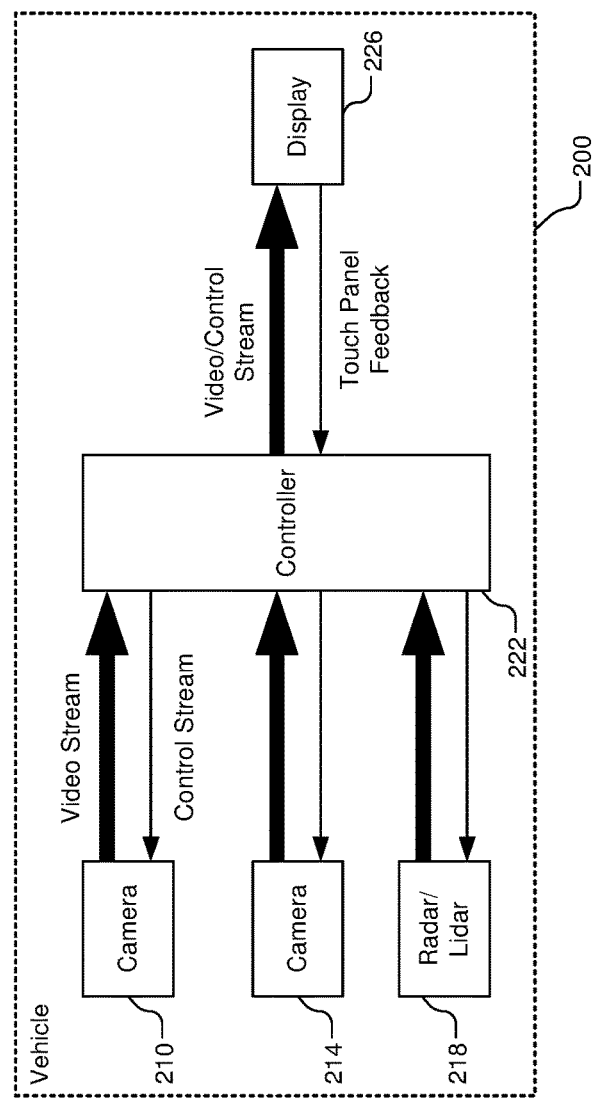
FIG. 2 is a functional block diagram of an example of a vehicle sensing system including one or more cameras and/or one or more sensors, a controller and a display.

Referring now to FIG. 2, an example of a vehicle sensing system for an autonomous vehicle is shown. The vehicle sensing system includes one or more cameras 210 and 214 and/or one or more sensors 218 such as a radar sensor, an infrared sensor or a LIDAR sensor. Outputs of the cameras 210 and 214 and the sensor 218 are transmitted to a controller 222 at high speed. A display 226 such as a touchscreen receives video signals from the cameras 210 and 214 after processing by the controller 222. The display 226 also sends a control stream including control signals to the controller 222. The control signals may adjust operation of the display, the cameras, the sensors or other vehicle functions or parameters. The controller 222 sends a control stream including control signals back to the cameras 210 and 214 and/or the sensor 218 at low speed.

As can be appreciated, the bulk of the data transfer is in one direction. In particular, the data transfer is predominantly from the cameras 210 and 214 or the sensor 218 to the controller 222. The control stream from the controller 222 to the cameras 210 and 214 occurs only occasionally and usually includes commands to the camera (i.e. turn on/off). In these systems, running the PHYs 118 and 122 with symmetrical speeds in both directions increases power consumption and cost and decreases reliability.

Figure 3A:
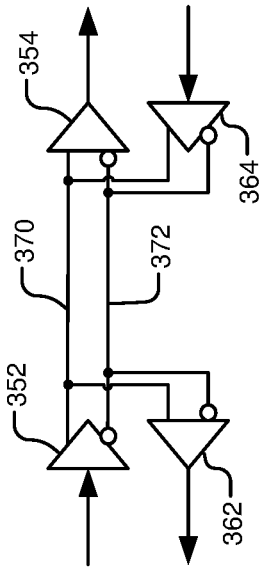
FIGS. 3A and 3B are electrical schematics of examples of dual simplex and dual duplex links.
Figure 3B:
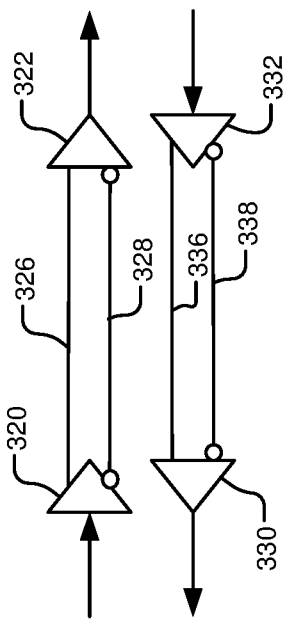

As will be described further below, the present disclosure relates to Ethernet PHYs that operate with asymmetrical speeds to reduce power consumption and cost and to increase reliability. In other words, the Ethernet PHYs operate at high speed in one direction and low speed in the opposite direction Referring now to FIGS. 3A and 3B, different type of media are shown. In FIG. 3A, a dual simplex connection is shown to include a transmitter 320 and a receiver 322 connected by a cable including conductors 326 and 328 to transmit in one direction. The dual simplex connection includes a transmitter 332 and a receiver 330 connected by a cable including conductors 336 and 338 to transmit in the opposite direction. In FIG. 3B, a dual duplex connection is shown to include a transmitter 352 and a receiver 362 connected by a cable including conductors 370 and 372 to transmit in one direction. The dual duplex connection includes a transmitter 354 and a receiver 364 connected by the same conductors 370 and 372 to transmit in the opposite direction.

In certain applications such as automotive applications, the medium 132 includes copper cables to connect the PHYs 118 and 122 since copper cables are inexpensive, robust against temperature, vibration, and repetitive bending (i.e. car doors) as compared to optical cables. It is also advantageous to transmit signals in both directions on the same copper cable at the same time (dual duplex) instead of having two sets of copper cables each running signals in a single direction (dual simplex). Using a single copper cable reduces the weight and cost of the medium 132. PHYs 118 and 122 (such as 100BASE-T1 and 1000BASE-T1 defined by IEEE 802.3) typically operate symmetrically (not asymmetrically) over the same copper cable.

Copper also has the advantage that it can transmit power over the same cable used for data to save weight and cost. In an ideal power delivery circuit, only DC current flows in the cable. In reality, the regulator used to deliver power generates low frequency noise on the cable that can interfere with the signal.

Figure 4:
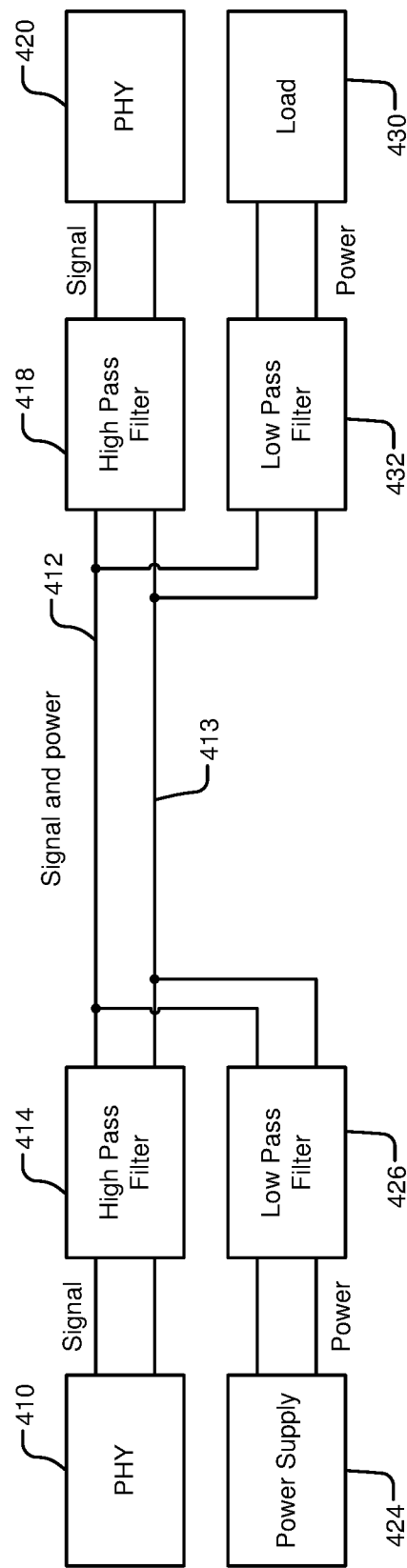
FIG. 4 is a functional block diagram of an example of a communications channel.

Referring now to FIG. 4, an example of filtering to allow frequency division multiplexing is shown. A PHY 410 is connected to first and second conductors 412 and 413 via a high pass filter 414. The conductors 412 and 413 are connected to a high pass filter 418 and into PHY 420. A power supply 424 associated with the PHY 410 is connected by a low pass filter 426 to the first and second conductors 412 and 413. The high pass filter 414 is bidirectional since the signal flows in both directions. The filtering will also work to isolate the PHYs from the power when the PHYs are operating symmetrically. A load 430 (such as one of the cameras and/or sensors) is connected by a low pass filter 432 to an output of the high pass filter 418.

The high pass filters 414 and 418 filter out power supply noise. The low pass filters 426 and 432 are used to filter out the signal from the power supply. It is advantageous to modulate the signal such that very little energy appears in the low frequency band. The higher the frequency that can be used for the cutoff between the low pass filter and high pass filter, the smaller the physical size of the filter, which reduces the cost of the low pass filter.

In order to transmit signals simultaneously in both directions over the copper cable, a transmission rate of the PHYs operates in a frequency locked manner. One PHY is designated the master PHY and the other PHY is the slave PHY. The slave PHY recovers a transmit frequency of the master PHY and uses that frequency to transmit its signal (or vice versa). Since the signals in both directions are generated at the same frequency in a symmetric system, it is possible for the PHY to cancel out its own transmit signal and any reflection of the transmit signal so that the received signal from the other transmitter can be recovered.

Figure 5:
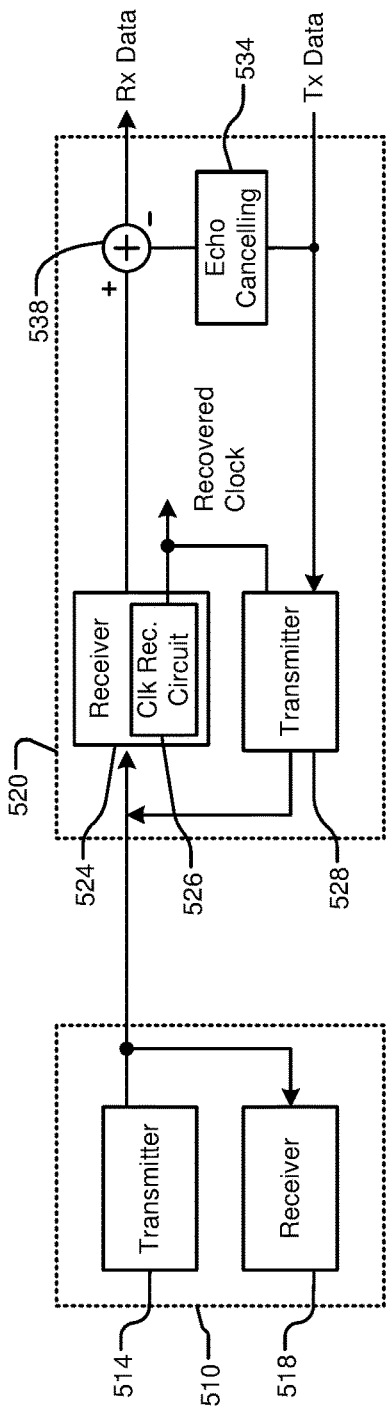
FIG. 5 is a functional block diagram of an example of link segment including a master PHY and a slave PHY.

Referring now to FIG. 5, a master PHY 510 includes a transmitter 514 and a receiver 518. A slave PHY 520 includes a transmitter 528 and a receiver 524. The receiver 524 includes a clock recovery circuit 526 to generate a recovered clock signal. The recovered clock signal is output to the transmitter 528. An echo cancelling circuit 534 removes a locally transmitted signal from a received signal from the transmitter 514 (using a summing circuit 538).

In principle, two PHYs operating symmetrically can transmit data asymmetrically by entering into an energy efficient Ethernet mode (EEE) as defined by IEEE 802.3. The PHY that does not need to transmit full data rate can periodically turn its transmitter on and off. This can be synchronized with the other PHY (link partner) so that the link partner can turn its receiver on and off. By using this approach, some power savings can be achieved. When there is data to send, the PHY transmitter and the PHY receiver are turned on and data is sent in a burst over the link segment at full speed for a short period of time. When there is no more data to be transmitted, the PHY transmitter and the PHY receiver are shut down.

Figure 6:
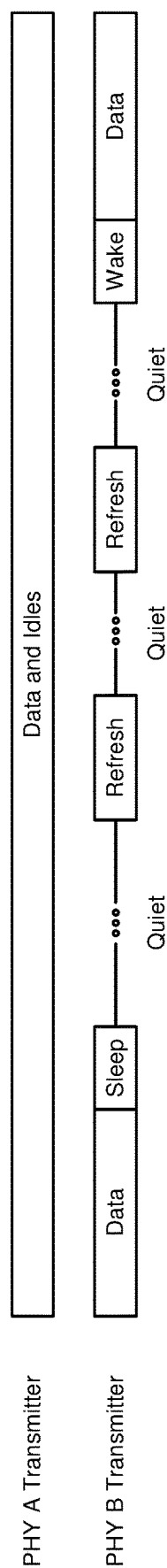
FIGS. 6 and 7 are examples of data timing diagrams for the master/slave communications channel.

Referring now to FIG. 6, PHY A is always transmitting data and idles. PHY B sends data and then lets PHY A know that it is going to sleep. PHY B periodically sends refresh signals to keep the link parameters locked, issues a wake signal to wake up PHY B, and resumes transmitting data. Power is saved during the quiet periods.

There are several drawbacks to this approach. There is a delay between the time that the data is available and the time the PHY B transmitter (and the PHY A receiver) are powered up and can transmit data (or receive data) since the wake time is non-zero. This approach works well if the data can be sent in bursts. If there is a slow trickle of data that is constantly sent, the PHY B transmitter may never get an opportunity to shut down (the same is true for the PHY A receiver). Even if no data is sent, power is used every time a refresh signal is sent. In order to keep the master and slave frequency locked and to account for slowly drifting channel properties (i.e. changes in temperature may alter the bandwidth of the cable) refresh signals are periodically sent in order to keep the PHY A receiver settings optimally configured. As the speeds increase, the period of the refresh gets shorter (even if the on/off duty cycle remains the same). Since it takes non-zero time for circuits to turn on and off, the actual duty cycle on/off increases as speed increases, and power savings are reduced.

Figure 7:
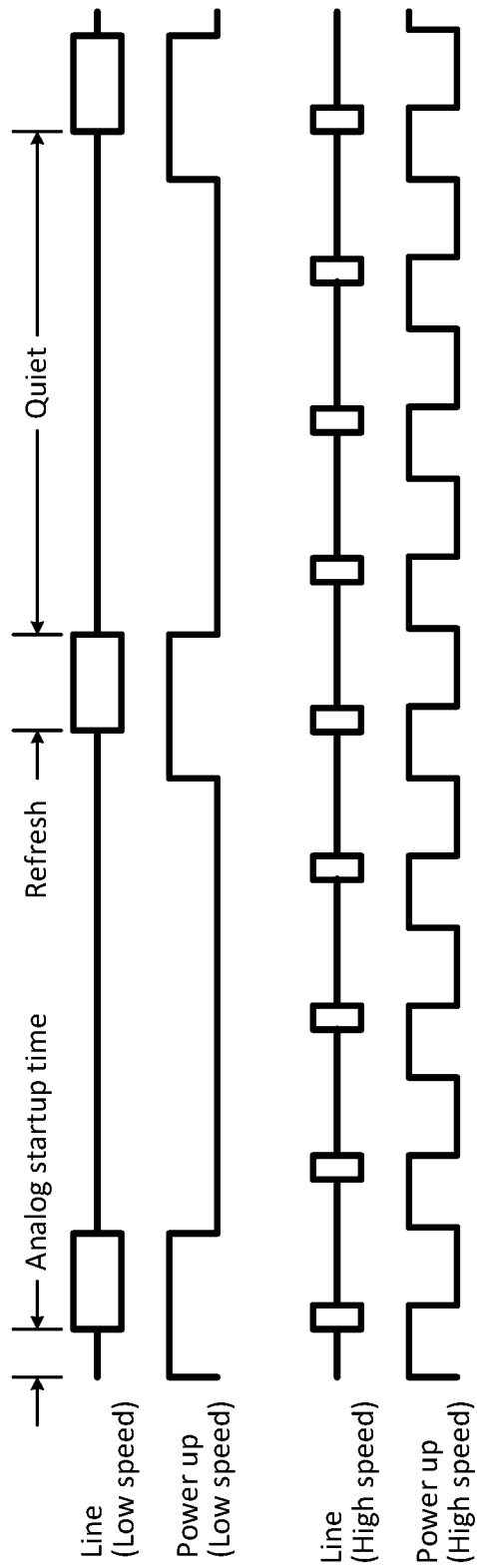

Referring now to FIG. 7, the ratio of refresh time to quiet time is identical in both cases, but because of the fixed time required to power up analog circuits (i.e. circuit turn on time does not scale with transmission speed), the actual power down time is less for the higher speed circuit.

Figure 8:
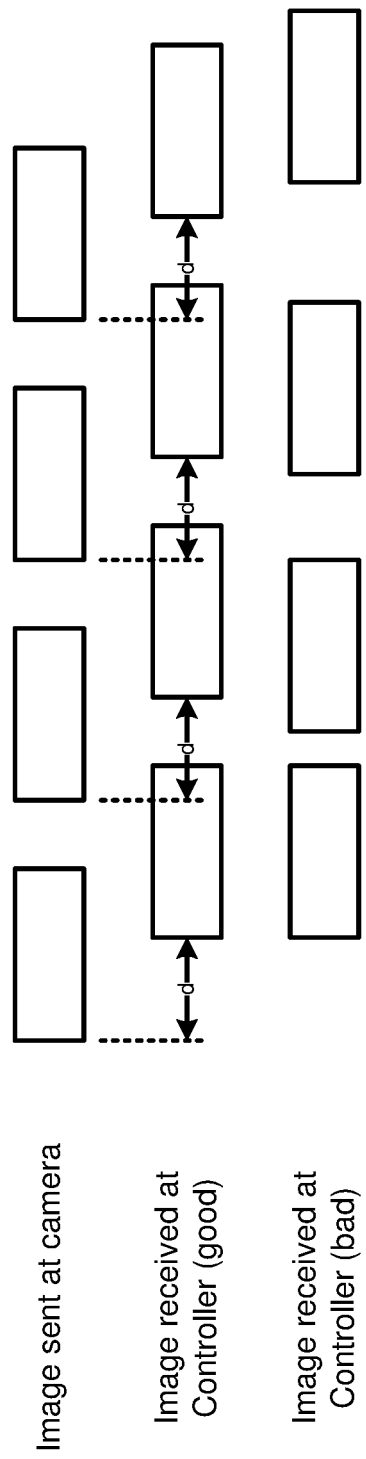
FIG. 8 is an example of a data timing diagram illustrating variable delays from a camera, sensor or other device.

Referring now to FIG. 8, it is important to have tightly bounded latencies when data is traversing through a network in some applications. For example, the PHYs should have tightly bound latencies when stitching together images from multiple cameras or sensors for machine vision and self-driving cars. It is also important for the controller to know the delay from the time a picture is taken to when it receives it. By accounting for the delays from each camera, the controller can determine which set of images should be stitched together so that the complete image is one that is captured at the same time.

Calculating this delay in the first place requires observing the delay in both directions of the PHY. Ideally the PHYs should introduce as little delay uncertainty as possible so that accurate delay measurements can be taken. Any scheme that requires storing and bursting data will introduce uncertainty.

IEEE 802 defines Ethernet to be a layered architecture. Any changes required should not touch the Media Access Control (MAC) layer, and any change should be limited to the PHY and reconciliation sublayers. The PHY includes of the Physical Coding Sublayer (PCS) and Physical Medium Attachment (9).

When operating in automotive environments, the media is subject to many different noise sources. One noise type is transient (or burst) noise and is modeled by ISO 7637-3. One method to mitigate noise is to use error correction circuitry where corrupted data can be corrected by redundancy in the data that is sent.

An Ethernet PHY according to the present disclosure includes a PHY that can switch between symmetrical and asymmetrical modes. The Ethernet PHY according to the present disclosure operates over copper media and can transmit in both directions simultaneously over the same media. In some examples, the Ethernet PHY according to the present disclosure can minimize the filter costs when delivering power over the same cables. In some examples, the Ethernet PHY according to the present disclosure has an asymmetric power profile that is at least as good if not better than traditional energy efficient Ethernet methods. In some examples, the Ethernet PHY according to the present disclosure minimizes the variability in the latency through the PHY. In some examples, the Ethernet PHY according to the present disclosure preserves the layered structure in IEEE 802 by not requiring changes to the MAC. In some examples, the Ethernet PHY according to the present disclosure also has the ability to mitigate against noise in the environment.

While the present disclosure discusses the asymmetric PHY using specific examples and numbers for illustration, variations of the examples set forth herein are contemplated. For example in the disclosure below, the 2.5GBASE-T1, 5GBASE-T1, and 10GBASE-T1 PHY is used as the high speed path running 2.5 Gb/s, 5 Gb/s and 10 Gb/s respectively and a low speed path of 10 Mb/s is used. However, the teaching set forth herein can be generalized to other PHYs such as 1000BASE-T1, 100BASE-T1, 1000BASE-T, 2.5GBASE-T, 5GBASE-T, 10GBASE-T (note -T not -T1) and the low speed path can be something other than 10 Mb/s (i.e. 100 Mb/s, 1000 Mb/s, etc.).

The following disclosure begins with operation of 2.5GBASE-T1, 5GBASE-T1, and 10GBASE-T1 PHY and then discusses interfacing the PHY to the MAC. Several asymmetrical design options are described that can work in conjunction with 2.5GBASE-T1, 5GBASE-T1, and 10GBASE-T1 PHY that is currently being defined in the IEEE 802.3ch. The idea is to show the motivation behind the choices taken using specific examples.

The 10GBASE-T1 PHY has a line baud rate is 5.625 Gbaud. 5GBASE-T1 line baud rate is 50% of the line baud rate and 2.5GBASE-T1 is 25% of the line baud rate. Pulse amplitude modulation 4 (PAM4) is used for signaling (i.e. 4 levels). Most of the energy of the signal is above 100 MHz.

Figure 9:
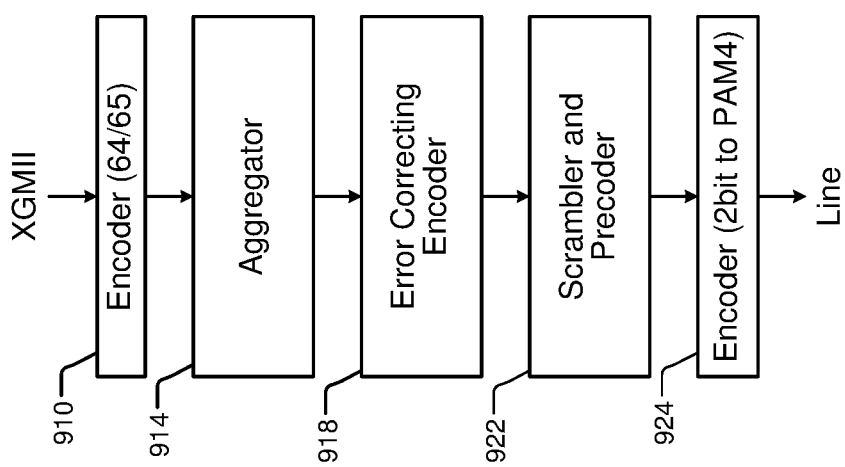
FIG. 9 is an example of a functional block diagram of a transmit path from the XGMII interface to the line.

Referring now to FIG. 9, a data path from XGMII to line is shown. The data path includes an encoder 910 to encode the data. In some examples, the encoder 910 includes a 64 bit/65 bit encoder. An aggregator 914 aggregates data. In some examples, the aggregator 914 aggregates blocks of data into frames. For example, the aggregator 914 aggregates 50 blocks of 64/65 encoded blocks into a Reed Solomon frame of 325 ten-bit symbols. An error correcting encoder 918 adds error correction. For example the error correcting encoder 918 may include a Reed Solomon that appends one additional 10-bit symbol followed by 34 10-bit parity symbol. This is the RS(360, 326) $GF(2^{10})$ coding. The Reed Solomon encoder may interleave the RS frame 4×, 2× or not at all depending on the configuration.

An output of the error correcting encoder 918 (e.g. a frame such as a Reed Solomon frame) is input to a scrambling and precoding circuit 922. Scrambling and precoding is applied to the symbols in the Reed Solomon frame. A PAM converter 924 converts 2 bits to PAM4. The error correcting encoder 918 allows for error correction at the receiver. The choice of the Reed Solomon parameters are to protect against the burst noise as modeled by ISO 7637-3. The scrambling helps with the DC balance of the signal. This allows low frequency noise to be filtered out at the receiver.

Note that every RS(360, 326) frame contains 360×10 bits of data that maps to 3600/2=1800 PAM4 symbols. The duration to transmit 1800 PAM4 symbols is 320 ns, 640 ns, and 1280 ns respectively for 10 G, 5 G, and 2.5 G. The receive process is the reverse of the transmit process.

From an IEEE 802.3 definitional point of view, the PHY sources and sinks data at the media independent interface (*MII—i.e. XGMII, GMII, MII, etc.). Whether the *MII is actually implemented is an implementation choice. There are several possible ways the *MII can be defined, and several practical ways the PHY hooks up to the MAC when the *MII is not exposed.

In the systems and methods discussed below, the data in the slow direction is continuously sent by the MAC. There is no stop and go. i.e. bursting data for short period at high speed followed by long period of idles. Bursting requires scheduling the burst which requires a change to how the MAC operates.

The MAC is an entity that generates and receives data frames. The frames are presented to the reconciliation sublayer where the frames are presented serially to the *MII interface. Several options describing how the signals are physically instantiated on the *MII to a multi speed PHY are discussed below. In this example, 2.5, 5, 10 Gb/s are used for the high speed mode and 10 Mb/s for the low speed mode.

In some examples, a separate interface can be used. The most simplistic solution is to have two separate interfaces XGMII and MII. The speed of operation determines which interface is used. XGMII for high speed and MII for low speed. These interfaces are defined by IEEE 802.3

In other examples, data replication can be used. Use the XGMII all the time. If the combination is 10 Gb/s to 10 Mb/s then on the slow path replicates data 1000 times. Similarly, 500 times and 250 times for 5 Gb/s and 2.5 G/s respectively. At the receiver, the data is downsampled. In order to determine the speed of the XGMII, the idle symbols preceding the frame can be encoded differently to indicate what mode it is in, as will be discussed below.

In still other examples, custom mapping can be used. The MII signals are overlaid on the existing XGMII signals. There are almost infinite variations on this idea. For example, the XGMII has 4 lanes, each lane has 8 data signals and 1 control signal. A special control code is assigned to lane 0 to indicate the 10 Mb/s mode. The MII signals are overlayed onto lane 1, and lanes 2 and 3 are unused. If the special control code is absent, normal XGMII operation is presumed.

Figure 10:
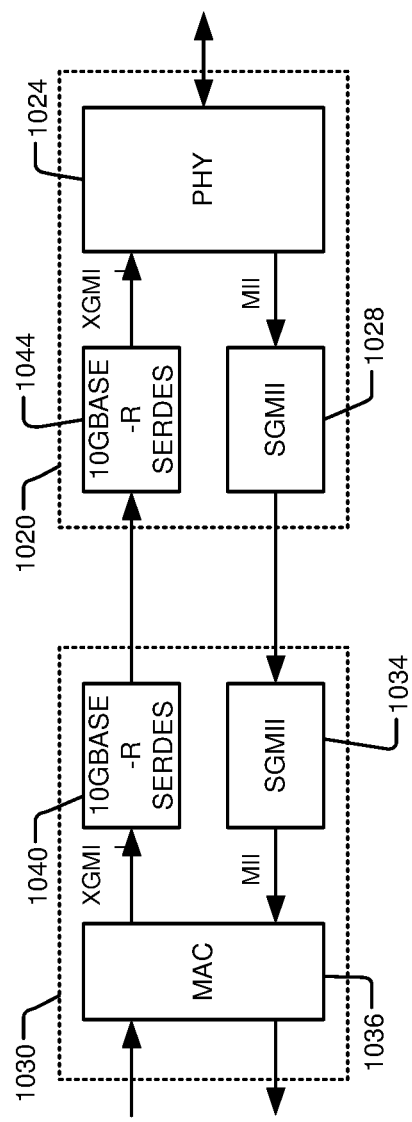
FIG. 10 is a functional block diagram of an example of one end of a link segment including a MAC and PHY with a SERDES according to the present disclosure.

Referring now to FIG. 10, a serializer/deserializer (SERDES) can be used to connect a MAC to a PHY. For lower speed data to a MAC 1036, a MII output of a PHY 1024 is connected by a serial GMII (SGMII) interface 1028 to an SGMII interface 1034. The SGMII interface 1034 outputs a MII output to a MAC 1036. For higher speed data from the MAC 1036 (e.g. XGMII), a 10GBase-R SERDES 1040 is connected to a 10GBase-R SERDES 1044, which outputs XGMII to the PHY 1024. This configuration is useful when the PHY 1024 and the MAC 1036 are located on different integrated circuits. In other words, the high speed path can be connected via 10GBASE-R and low speed via SGMII.

Figure 11A:
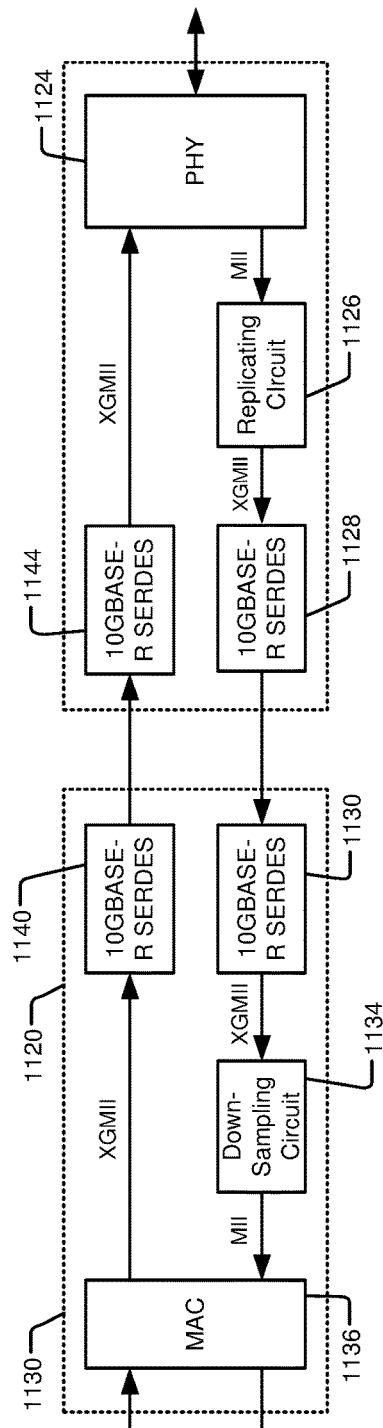
FIGS. 11A and 11B are functional block diagrams of an example of one end of a link segment including a MAC and PHY with replication according to the present disclosure.
Figure 11B:
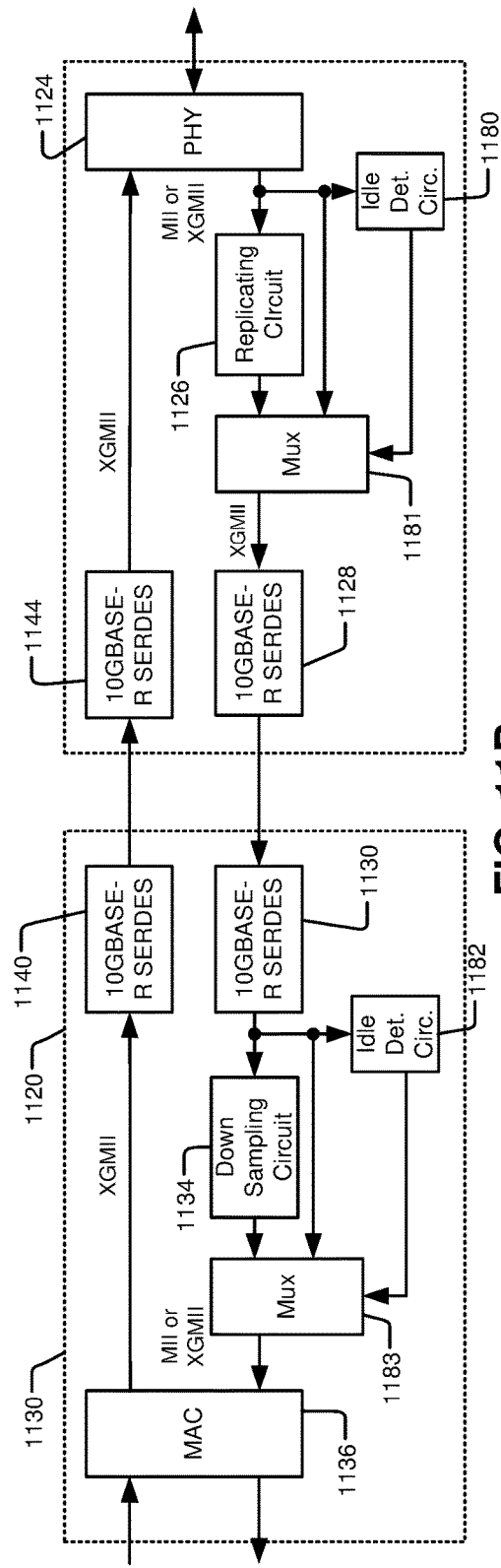
Figure 12:
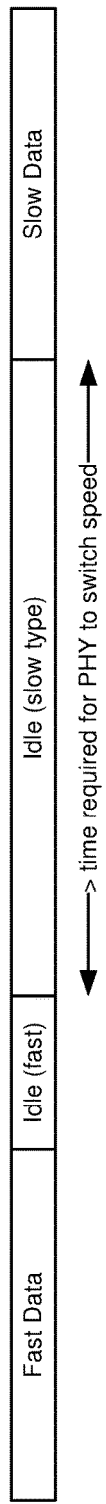
FIG. 12 is an example of a data timing diagram for an asymmetric mode according to the present disclosure.

Referring now to FIGS. 11A to 12, another approach is shown. In FIG. 11A, for the lower speed data, a PHY 1124 outputs a MII output to a replicating circuit 1126 that replicates the data (by a ratio of the high speed over the low speed) into an XGMII output that is received by a 10GBase-R SERDES 1128. A 10GBase-R SERDES 1130 receives the output of the 10GBase-R SERDES 1128 and generates an XGMII output. The XGMII output is downsampled by a downsampling circuit 1134 (by an inverse of the ratio) into a MII output. The MAC 1136 receives the MII output.

For the higher speed data, the MAC 1136 outputs an XGMII output to a 10GBase-R SERDES 1140, which serializes the signal. A 10GBASE-R SERDES 1144 receives the serialized signal and outputs an XGMII signal to the PHY 1124. In this example, the SERDES runs symmetrically in both directions.

In FIGS. 11B and 12, an idle detecting circuit 1180 receives an output of the PHY 1124. The idle detecting circuit 1180 detects the type of idles that are being used and transitions from one type of idle to another type of idle. A multiplexer 1181 receives an output of the replicating circuit 1126 and the PHY 1124. The idle detecting circuit 1180 monitors the output of the PHY 1124 selectively sends a control input to switch the multiplexer 1181 between the replicated output of the replicating circuit 1126 (for slow speed operation) and the output of the PHY 1124 (for high speed) based on the idles and idle transitions.

An idle detecting circuit 1182 receives an output of the 10GBase-R SERDES 1130. A multiplexer 1183 receives an output of the downsampling circuit 1134 and the output of the 10GBase-R SERDES 1130. The idle detecting circuit 1182 also detects the type of idles and controls the multiplexer 1183 between the downsampled output of the downsampling circuit 1134 and the output of the 10GBase-R SERDES 1130.

It takes time for the PHY to switch in and out of the low speed mode. The switch should occur when there is no data to transmit (idles). Referring now to FIG. 12, different idle symbols can be used to indicate the current operating mode. The general sequencing is to briefly send idles of the first mode, switch to idles associated with the second mode and wait a certain period of time before sending data in the second mode. The amount of time to wait is determined by the time needed by the PHY to switch modes. In some examples, the idle detecting circuits 1180 and 1182 delay switching during the wait period.

Figure 13:
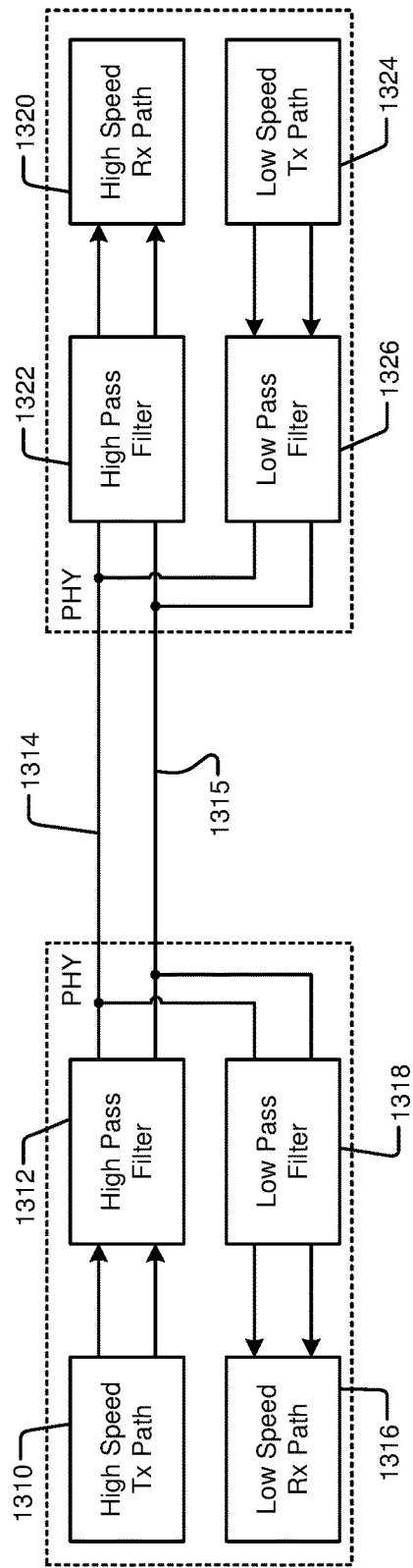
FIGS. 13 and 14 are functional block diagrams of examples of a link segment using frequency division multiplexing according to the present disclosure.
Figure 14:
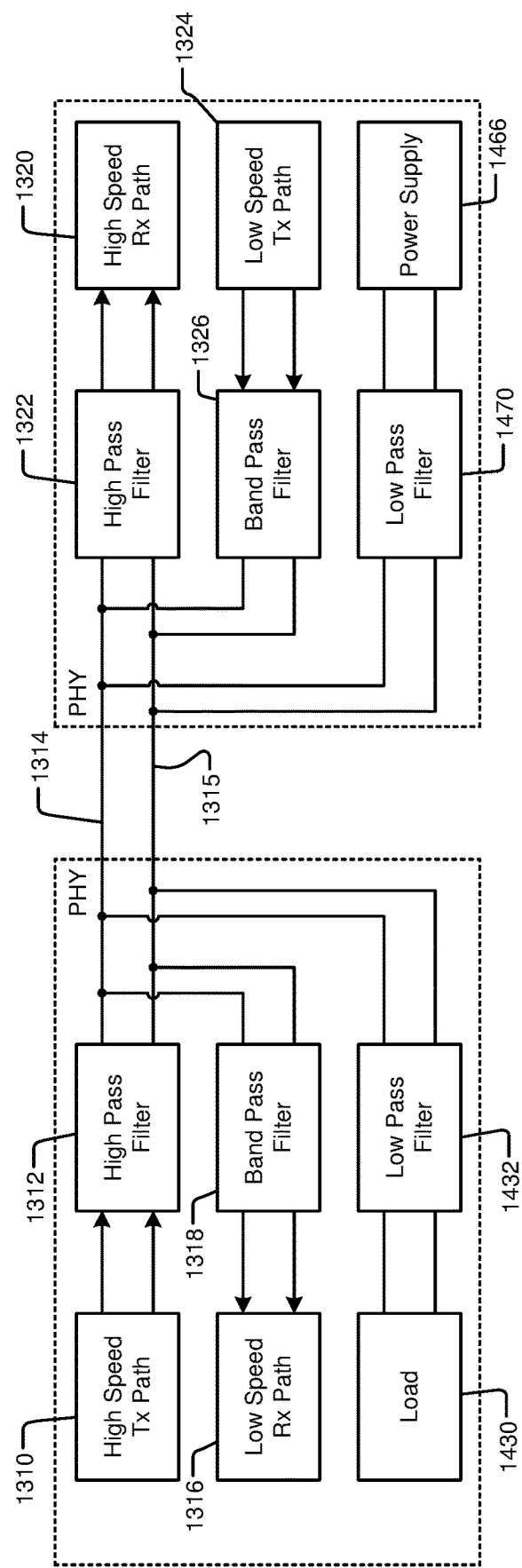

Referring now to FIGS. 13 and 14, frequency division multiplexing is shown. In FIG. 13, frequency division multiplexing works by separating signals into different frequency bands. Since the high speed signal has most of its energy content above 100 MHz, the high speed signal is passed using a high pass filter. The low speed signal is passed using a low pass filter since the low speed signal has most of its energy content below 100 MHz.

In FIG. 13, one end of the link segment includes a high speed transmitter path 1310 connected by a high pass filter 1312 to a copper cable including conductors 1314 and 1315. A low speed receiver path 1316 is connected by a low pass filter 1318 to the conductors 1314 and 1315. An opposite end of the link segment includes a high speed receiver path 1320 connected by a high pass filter 1322 to the conductors 1314 and 1315. A low speed transmitter path 1324 is connected by a low pass filter 1318 to the conductors 1314 and 1315. In some examples, the high pass filters 1323 and 1322 can have a cutoff frequency that is higher than a cutoff frequency of the low pass filters 1318 and 1326. In other examples, there is some overlap between the cutoff frequencies of the high pass filters 1323 and 1322 and the low pass filters 1318 and 1326. The frequency range passed by the low pass filters and high pass filters is different. In other words, the high pass filters can pass frequencies above a first cutoff frequency and the low pass filters can pass frequencies below a second cutoff frequency. In some examples, the first cutoff frequency is higher than the second cutoff frequency (no overlap). In other examples, the first cutoff frequency is lower than the second cutoff frequency (some overlap). As can be appreciated, with or without overlap, the first frequency range passed by the high pass filter (frequencies above the first cutoff frequency) is different than the second frequency range passed by the low pass filter (frequencies below the second cutoff frequency).

As can be appreciated, the high pass filters 1312 and 1322 can be replaced by band pass filters having a high band pass frequency range. The low pass filters 1318 and 1326 can be replaced by band pass filters having a low band pass frequency range. The high band pass frequency range can have a low cutoff frequency that is higher than a high cutoff frequency of the second band pass frequency range. In other examples, there can be some overlap between the high band pass frequency range and the low band pass frequency range.

In FIG. 14, if power is transmitted over the same copper cable then the low speed signal should also have most of its energy content some amount above DC. A load 1430 such as a camera, sensor or other device is connected by a low pass filter 1432 to the conductors 1314 and 1315. A power supply 1466 is connected by a low pass filter 1470 to the conductors 1314 and 1315. The low pass filters 1432 and 1470 may pass signals below 2 MHZ to 5 MHz, which is a reasonable limit to allow power supply noise to be filtered out. As with the PHYs in FIG. 13, band pass filters can be used instead of the low pass filters or high pass filters and/or some overlap of the cutoff frequencies can be used.

Figure 15:
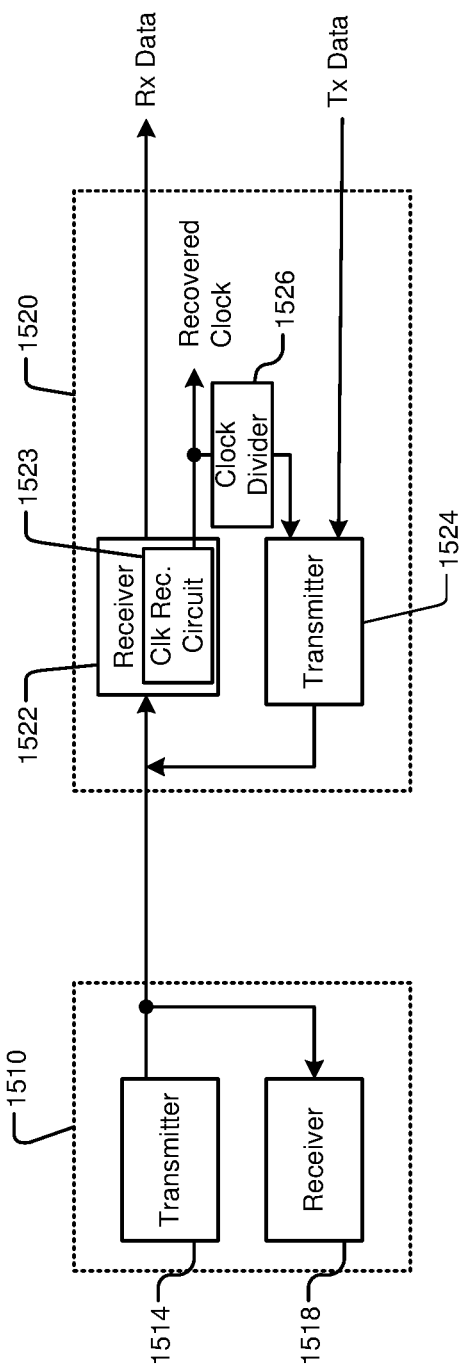
FIG. 15 is a functional block diagram of an example of master with fast transmit speed and a slave with slow transmit speed according to the present disclosure.

Referring now to FIG. 15, signal modulation for the low speed data path is used so that the data can be transmitted reliably. In FIG. 15, a master PHY 1510 includes a transmitter 1514 and a receiver 1518. A slave PHY 1520 includes a transmitter 1524 and a receiver 1522. The receiver 1522 generates a recovered clock signal. A clock divider circuit 1526 divides the recovered clock signal by T, which is an integer greater than 2. For example, T can be set equal to 5, 10, 100 or another integer. In some examples, T is equal to 180, 90, 45.

More power can be saved if signal arrival times are predictable. Circuits can be powered down during intervals when no signals are expected. In some examples, predictability can be improved by synchronizing a clock of the low speed path to a clock of the high speed path so that the clock frequencies have a fixed ratio with no frequency drift. The zero frequency drift also results in a simpler (and lower power) clock recovery circuit. However, there is no requirement for zero frequency drift. In other words, a different clock other than the recovered clock can be used in some examples.

Let PHY A transmit 10GBASE-T1, 5GBASE-T1, and 2.5GBASE-T1 which have a transmit clock rates of 5.625 GHz, 2.8125 GHz, and 1.406.25 GHz respectively. If a fixed ratio of 180, 90, and 45, respectively, are used, the slow path (PHY B) will have a transmit clock rate of 31.25 MHz with no frequency drift. By doing this, PHY A can expect to receive exactly one symbol of (slow) data for every 180, 90, or 45 symbols that it sends out.

If the slow path data rate is 10 Mb/s, then the time it takes to transmit one bit is 100 ns. The time it takes to transmit 64 bits is 6400 ns. Based on the discussion above, 6400 ns corresponds to the duration to transmit 20, 10, and 5 RS frames for 10 G, 5 G, 2.5 G respectively. This corresponds to 36000, 18000, and 9000 symbols respectively. If dividing by the fixed ratios of 180, 90, 45, it results in 200 symbols transmitted in the 10 Mb/s path every 6400 ns. As a result, there are 200 symbols available to transfer 64 bits of data.

Referring now to FIG. 17A, an example of framing of the 64 bits is shown to include a header field, a data payload field and a parity field. In FIG. 17B, a low speed data path is shown. The low speed data path includes an encoder 1710 to encode the XGMII data (or MII data). A scrambler 1714 is optional and can be used to scramble an output of the encoder 1710. A error correcting encoder 1718 encodes an output of the scrambler 1714.

An output of error correcting encoder 1718 is input to a Manchester encoder 1722. An output of the Manchester encoder 1722 is input to one input of a multiplexer 1728. A fixed pattern header generator 1724 generates a fixed pattern that is output to another input of the multiplexer 1742. A sync frame generator 1726, a padding generator 1728 and a control/status frame generator 1730 are connected to other input of the multiplexer 1744. An output of the multiplexer 1742 is input to a transmitter 1744. A controller 1734 receives the XGMII input and controls the multiplexer 1742 and the transmitter 1744.

An output of the transmitter 1744 is connected by the cable medium to a receiver 1746. An output of the receiver 1746 is input to a frame aligner 1748. The frame aligner 1748 delineates the frame boundary of the frames shown in FIG. 17A and removes the header in the received data. At output of the frame aligner 1748 is input to a Manchester decoder 1750. An output of the Manchester decoder 1750 is input to an error correcting decoder 1752. An output of the error correcting decoder 1752 is input to a descrambler 1754 (if scrambling was used). An output of the descrambler 1754 (if used) or the error correcting decoder 1752 is input to a decoder 1758.

In some examples, the encoder 1710 performs 64 bit to 65 bit encoding to frame the data. To protect the data from noise bursts as modeled by ISO 7637-3, the error correcting encoder 1718 may include a Reed Solomon encoder using RS(17, 13) over $GF(2^5)$. The 65 bits are divided into 13 5-bit symbols and four 5-bit parity symbols are appended, which results in a RS frame of 17×5 bits=85 bits.

Figure 16:
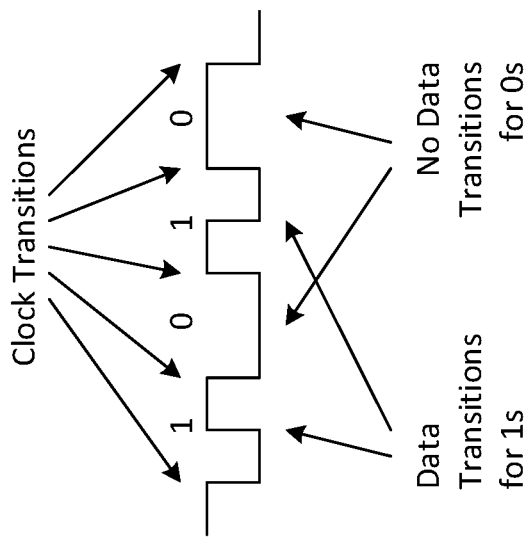
FIG. 16 illustrates clock and data transitions for Manchester encoding according to the present disclosure.

Referring to FIG. 16, one way to move the signal content above DC so that power can be transmitted on the same cable is to use the Manchester encoder 1722. 2 bits on the line are used to encode 1 data bit. The 2 bits form the clock and data transitions. A clock transition occurs on every other bit boundary. A data transition occurs if a data bit is 1, and no transition if the data bit is 0. By using Manchester encoding, the energy content of the signal centers around 31.25/2 MHz=15.625 MHz and 31.25/4 MHz=7.8125 MHz. Hence the 85 data bits in the RS(17,13) frame expands to 2×85=170 bits.

To fill the remaining bits, Manchester O's can be used before and after the 170 bits. The fixed pattern header 1724 provides the remaining 26 bits. In some examples, the fixed pattern header 1724 generates a 26 bit pattern that violates Manchester coding to allow the receiver 1740 to lock onto the pattern. For example, the 26 bits may include a fixed pseudo-random pattern, a Golay-26 pattern or another pattern that violates Manchester coding. Padding with Manchester O's is not really necessary and the pseudo random sequence can be made longer instead of padding.

The data can be scrambled prior to the Reed Solomon encoder to randomize the harmonics of the signal on the line. The 10 Mb/s signal stream is formed by the 200-bit frame.

Figure 17C:
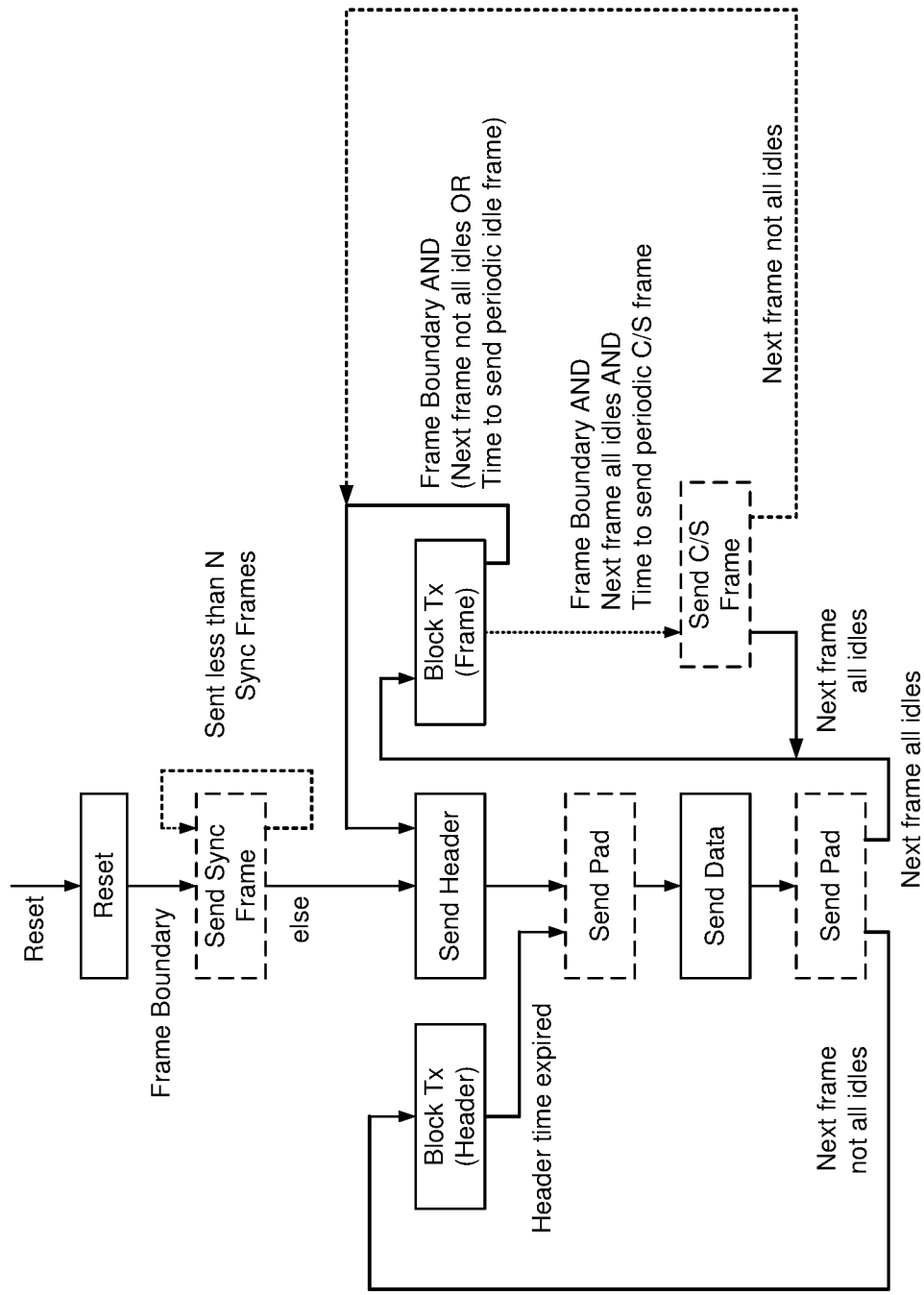
FIG. 17C is an example of a state diagram for the transmit path and a receive path of FIG. 17B according to the present disclosure.

Referring now to FIG. 17C, a state diagram illustrating the sequence of the controller 1734 is shown. Dashed boxes and lines show options. For example, sending of pad bits are shown in dashed boxes. In some examples, sync frames are sent prior to starting (send sync frame). When the controller 1734 is in reset or any of the block Tx, the transmitter is in a low power state to save power.

Figure 18:
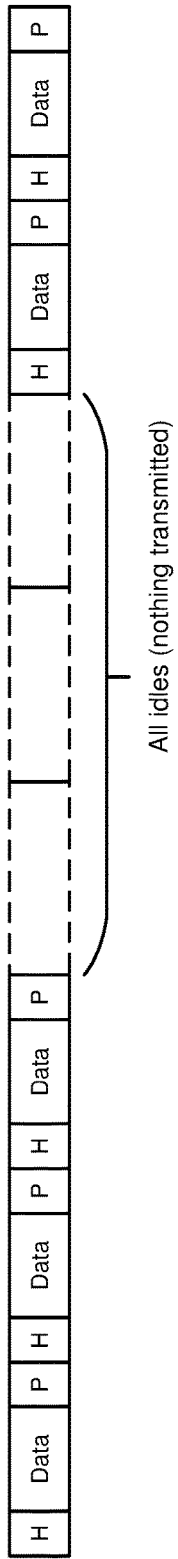
FIGS. 18 and 19 are examples of packet data timing diagrams according to the present disclosure.
Figure 19:

Referring now to FIGS. 18 and 19, transmission of 200-bit frame is shown. In FIG. 18, to save power, the 200-bit frame is sent only if at least one symbol is not an idle symbol. The controller 1734 can detect all idle/non-idles by observing activity on the XGMII. When all idles are sent, the transmitter can be shut down (block Tx frame). Note that the gap when nothing is sent is the same amount of time as the duration of an integer number of 200-bit frame. The frame boundary signal is asserted at the boundaries of the 200-bit frame. If the 200-bit frame has a mix of data and idle symbols, then the idle symbols will be sent along with the data. In FIG. 19, further power reduction can be achieved by the controller 1734 by not transmitting the header in the frames after the first frame after the quiet period (block Tx header).

Note that the transmitter can periodically send 200-bit frames with only idles to let the receiver know that it is still operating if there are long periods of time when there is nothing being transmitted (for example time to send periodic idle frame signal asserted). This is an important feature in fault tolerant systems, as it lets the receiver differentiate whether the link partner is still operating properly but has nothing to send versus the link partner sending nothing because it failed. An alternative is to send a frame with some other in-band control/status data (send C/S frame). Another alternative to sending 200-bit frame with idles can be a synchronization frame described further below. This is not explicitly shown in the state diagram. This can be achieved by sending the synchronization frame instead of the C/S frame.

The receiving side is the reverse of the transmit process where the receiver aligns to the fixed pattern, Manchester decodes, error corrects, de-scrambles if needed, and performs 65/64 decoding. Note that the Reed Solomon encoding can achieve better error correction if the locations with Manchester encoding violations can be marked as erased symbols in the Reed Solomon decoding. For example, received symbols with Manchester encoding violations can be marked erased.

Figure 20:
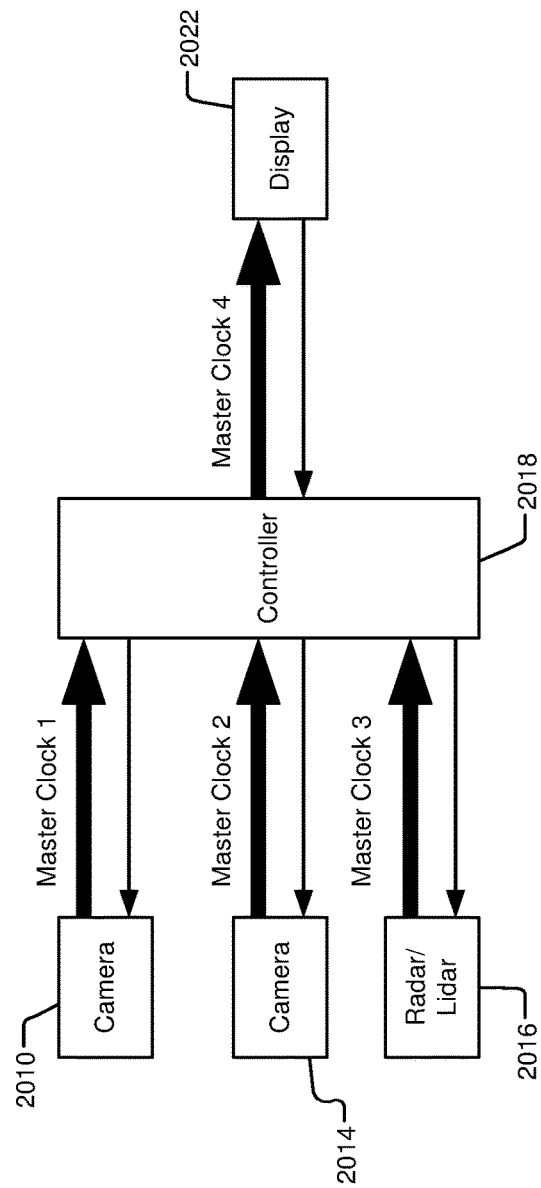
FIGS. 20 and 21 are functional block diagrams examples of vehicle sensing systems including one or more cameras and/or one or more sensors, a controller and a display with different master clocks or a common master clock, respectively, according to the present disclosure.
Figure 21:
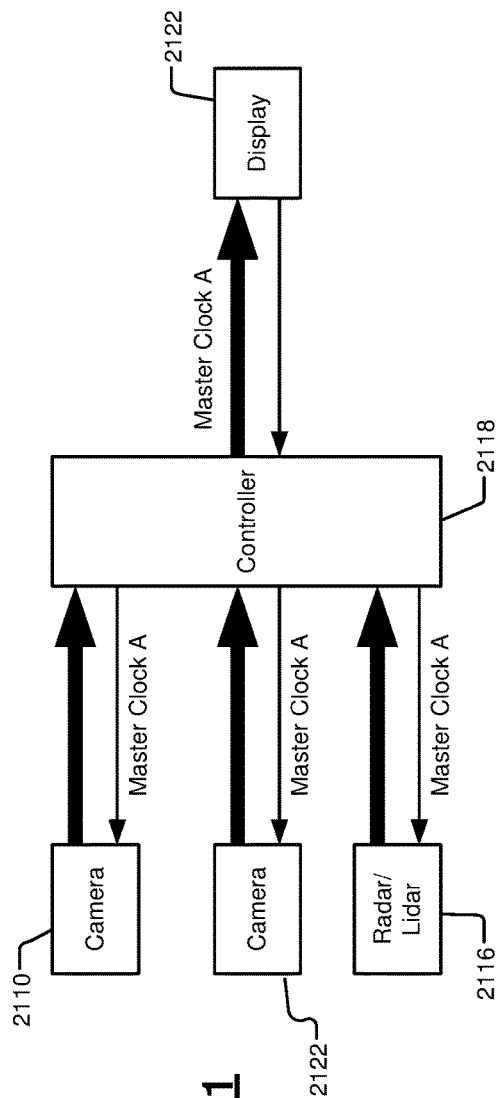

Referring now to FIGS. 20 and 21, further enhancements can be made. In the following examples, PHY S includes the PHY with a slow transmitter and a fast receiver and PHY F includes the fast transmitter and the slow receiver. In the preceding examples, the PHY F is the master PHY that controls the clock frequency. This results in multiple clocks that have frequency drift among themselves.

In FIG. 21, a more ideal situation would be for the controller or switch have one master clock. In this case, one of the PHYs corresponding to the PHY S will be the clock master. If PHY S is the clock master, PHY F can determine its proper clock frequency since it is a fixed ratio faster than the low speed clock. The frequency can be determined based on a combination of the spacing of the signal toggling in the 200-bit frame and the spacing between the 200 bit frames.

PHY S will have to send many more 200-bit frames (some all idle symbols) for PHY F to correct its clock frequency since the frequency will drift over time. This is similar to the standard EEE where periodic refresh signals are sent in order to keep the frequencies locked. There is a power penalty for sending additional 200-bit frames (with nothing but idles) if the PHY S is to be the clock master. In this scenario, PHY F has the burden of computing when to speed up or slow down its transmit clock based on the 200-bit frame sent by PHY S.

Another approach can be used to send fewer 200-bit frames. If the PHY S picks up the burden of determining whether a transmit clock of the PHY F is drifting fast or slow, it can send 200-bit frames only when it is necessary to alert PHY F to speed up or slow down. Note that in this approach, PHY F can still use 200-bit frames it receives to compute when to speed up or slow down.

If a scrambler is used in the low speed mode, it may be necessary to give the receiver an opportunity to lock its descrambler to the scrambler when the PHY first transitions into the low speed mode. One way to do this is to send several 200-bit frames to give the receiver information to sync the descrambler. The header can be a different header indicating that this is a synchronization frame. The data portion of the frame can be all zeros XOR with the scrambler sequence instead of the usual 64/65 encoded data+RS parity. The receiver can load its descrambler with the received sequence. Note that this signal can be part of the synchronization process described below.

Figure 22:
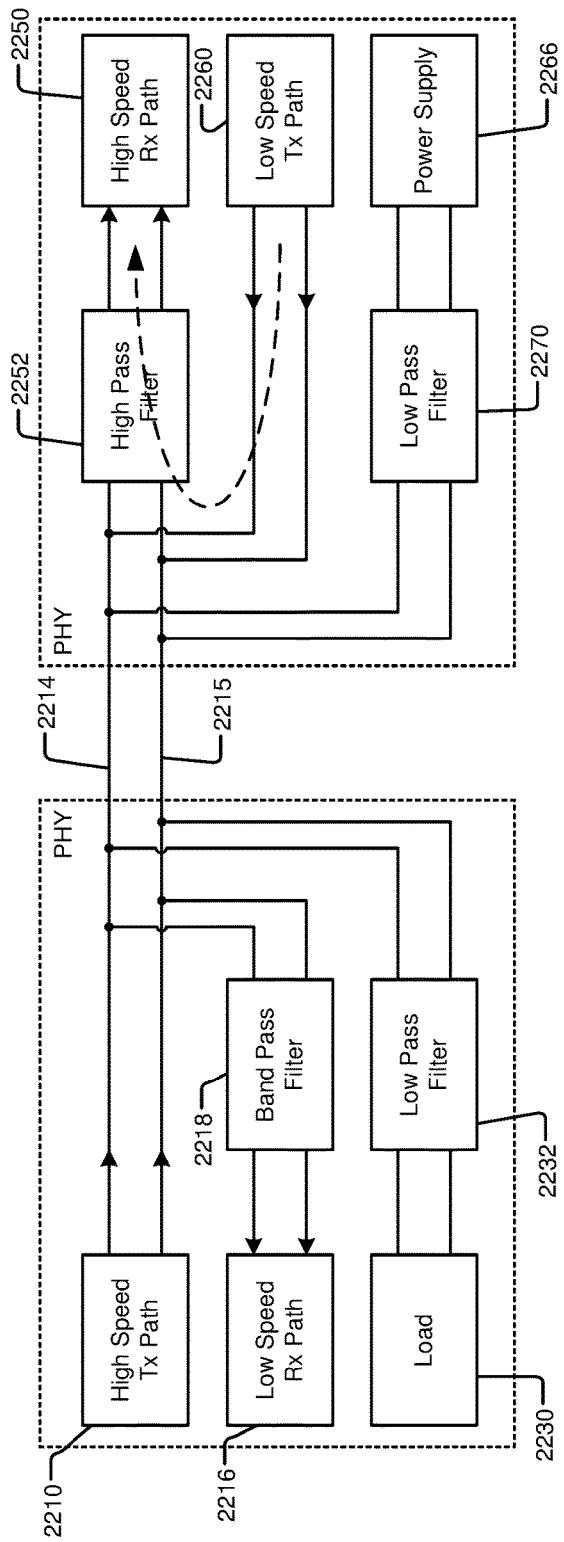
FIG. 22 is a functional block diagram of example of a communications channel including frequency division multiplexing with fewer filters according to the present disclosure.

Referring now to FIGS. 22 to 23B, the system shown in FIG. 14 above can be simplified by removing some filters from the transmitters. In FIG. 22, one end of the link segment includes a high speed transmitter path 2210 connected to a copper cable including conductors 2214 and 2215 (without a filter). A low speed receiver path 2216 and a low pass filter 2218 are connected to the conductors 2214 and 2215. A load 2230 such as a sensor or camera is connected by a low pass filter 2232 to the conductors 2214 and 2215.

An opposite end of the link segment includes a high speed receiver path 2250 connected by a high pass filter 2252 to the conductors 2214 and 2215. A low speed transmitter path 2260 is connected to the conductors 2214 and 2215 (without a filter). A power supply 2266 is connected to a low pass filter 2270, which is connected to the conductors 2214 and 2215. As with the PHYs in FIGS. 13 and 14, band pass filters can be used instead of the low pass filters or high pass filters and/or some overlap of the cutoff frequencies can be used.

In FIG. 23A, the removal of the filters may cause some issues if a transmitter that can operate at high speed is configured to operate at the low speed. High speed signals inherently have fast slew rates on edge transitions. If the transmitter is slowed down simply by toggling less without slowing down the slew rate, high frequency energy can reflect back to the high speed receiver as shown by the dotted lines, hence interfering with the high speed receive path, as the high pass filter will not filter out the high frequency reflections. The slew rate can be reduced by shaping the low speed transmit signal, thereby reducing the high frequency energy. The shaping can be achieved via low pass filtering, or by transmitting different amplitudes over discrete time periods during the signal transition.

In FIG. 23B, one way to transmit different amplitudes over discrete time periods is to use a Digital to Analog converter (DAC) coupled to a table lookup. The DAC is run some multiple times faster than the slow data (say M where M is an integer greater than one). The table will then have 4 sequences of M data points. The M data points specify the data amplitude to sequence through for each of the 4 sequences. The 4 sequences are data low to data low, data low to data high, data high to data low, data high to data high.

The table lookup is just an example of how things can be shaped by looking at the previous and current data value. More sophisticated digital filters can be used that look at more data points.

Figure 25:
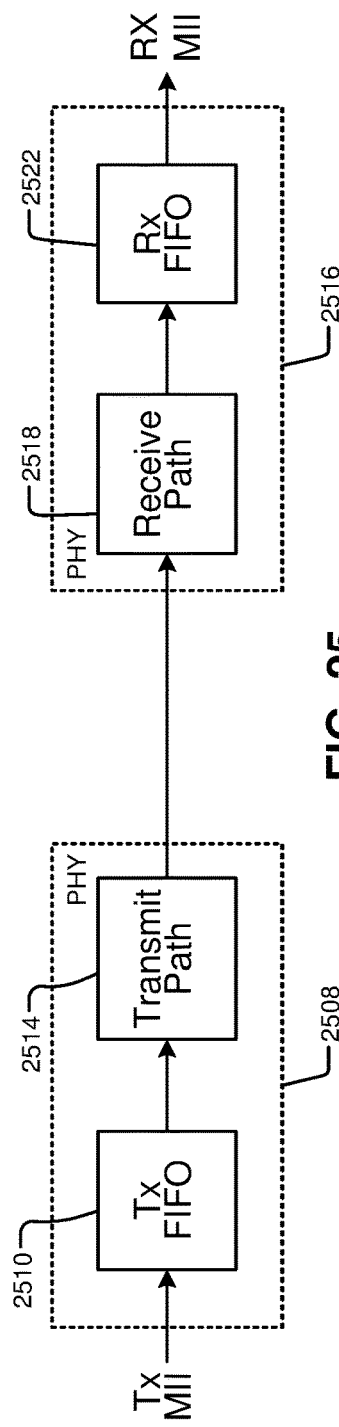
FIG. 25 is a functional block diagram of a transmit PHY including a transmit FIFO and a transmit path and a receive PHY including a receive path and a receive FIFO according to the present disclosure.
Figure 26:
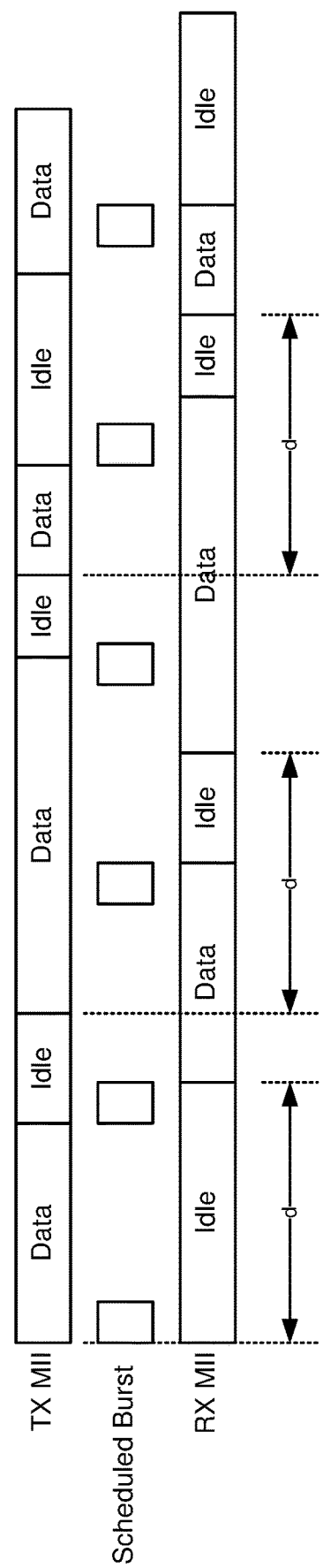
FIGS. 26 and 27 are examples of a data timing diagram according to the present disclosure.

Referring now to FIGS. 24 to 26, time division multiplexing can be used. As discussed above, the standard approaches can be used to send asymmetric data. However these approaches suffer from transmission delays waiting for the PHY to exit the low power state. In FIG. 24, one way to reduce the delay is to periodically schedule data to be transmitted. Since the scheduling is known ahead of time, there are no delays associated with waiting for the PHY to exit the low power state. Scheduling data can be appended to a refresh signal. If during a scheduled transmission there is no data to be transmitted, then nothing will be appended to the refresh signal.

Scheduled transmission poses the problem since the MAC has to be modified so that its burst of data coincides with when the PHY schedules the transmission. This is pretty much impossible from a practical point of view since the IEEE 802 layering requires the MAC to be PHY agnostic.

Referring now to FIGS. 25 and 26, FIFOs can be used to allow operation of the MAC at a slower speed than the PHY. In FIG. 25, on one end of the link segment, a PHY 2508 includes a FIFO buffer 2510 prior to a transmit path 2516 including the transmitter. On the other end, a PHY includes a FIFO buffer 2522 in a receive path 2518 including the receiver. As discussed above, instead of having the MAC burst the data, the MAC can simply operate at a lower speed. The (slow) data is queued into a FIFO and then sent in a burst during the scheduled time. Since the data is held in the Tx FIFO 2510 prior being transmitted in a burst, it is possible to know a-prior whether the FIFO contains all idles or not. Hence a decision can be made on whether to append data to the refresh signal. On the receiving end, the data is held in the Rx FIFO 2510 and output to the MAC at a lower speed.

In order to maintain deterministic latency across the link segment, the FIFO stores the data symbols from the MII and/or the idle symbols. Passing the idle symbols with the data symbols insures the temporal spacing between the data is maintained as shown in FIG. 26. Note that idle symbols can be occasionally inserted or deleted at the transmit FIFO to correct for any clock drift between the transmit MAC and the PHY.

Figure 27:
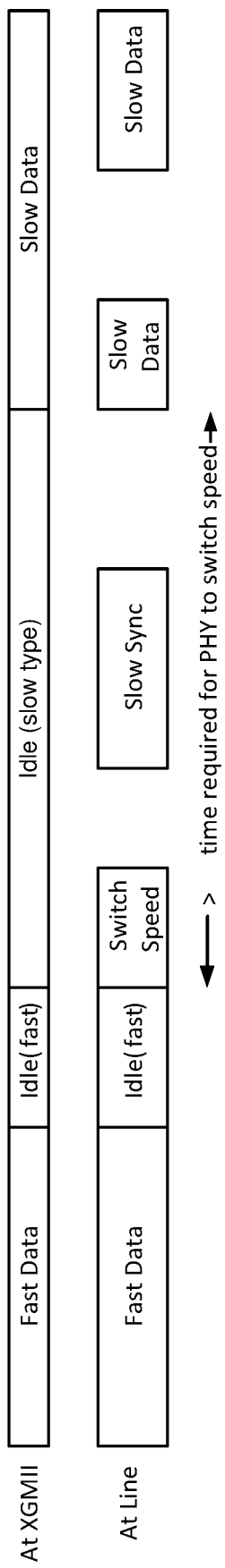

Referring now to FIG. 27, as described above, the MAC indicates to the PHY to enter and exit the low speed mode. A similar process is used for a PHY to indicate to its link partner to change speed. The PHY sends a switch speed signal at the fast data rate. At the end of this signal, a slow synchronization signal is sent. After the synchronization is completed, slow data can commence. This process can be used with either methods described above.

Figure 28A:
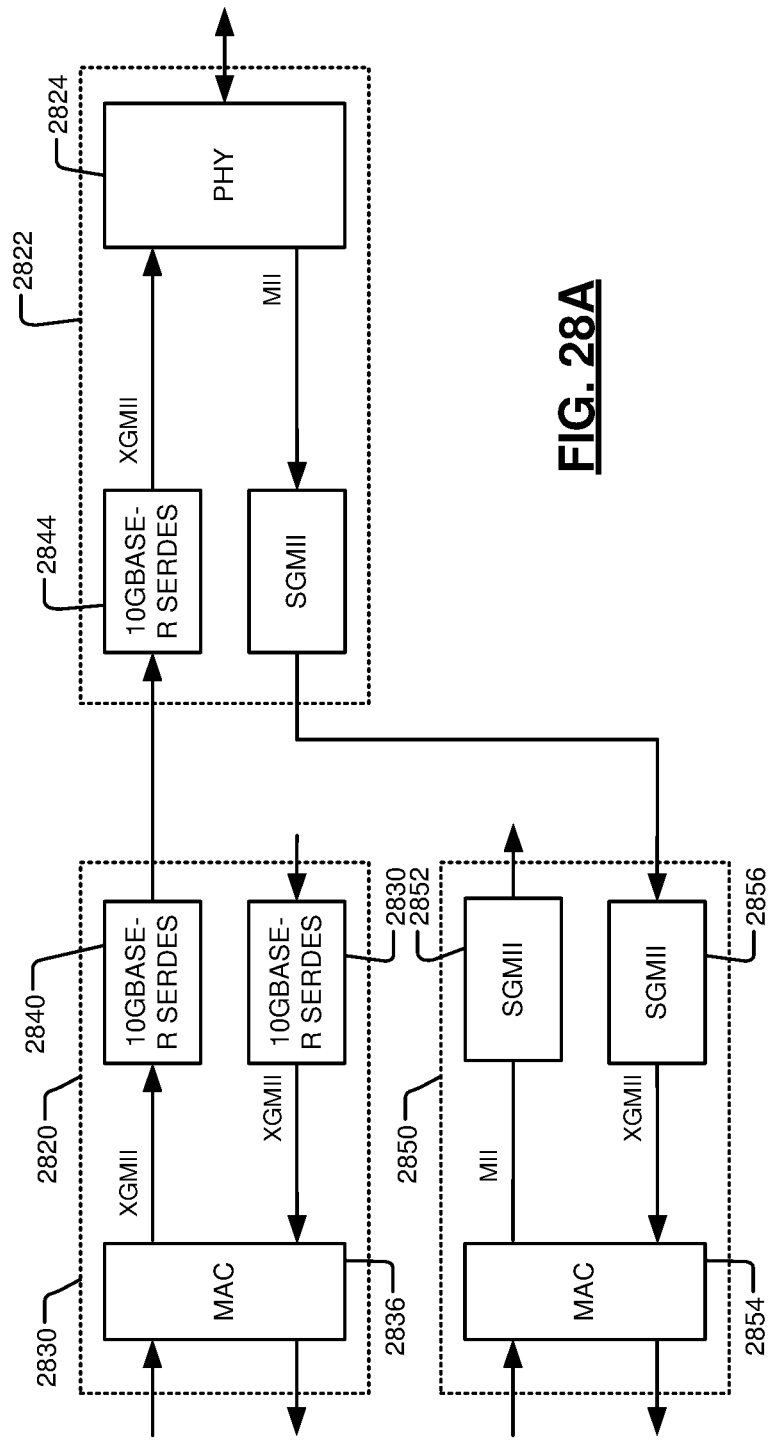
FIGS. 28A and 28B are functional block diagrams of one end of a link segment including a high speed MAC and a low speed MAC connected to an asymmetric PHY according to the present disclosure.
Figure 28B:
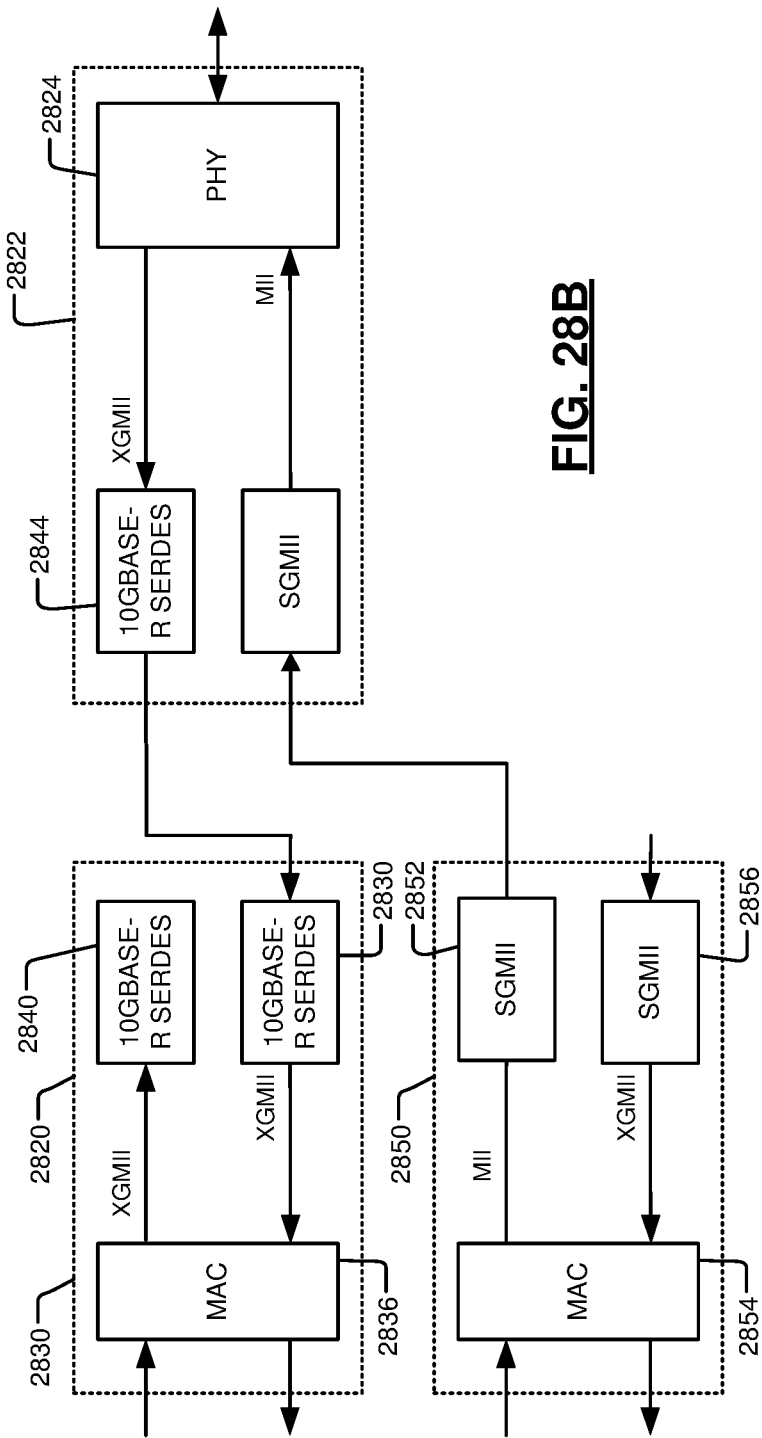

Referring now to FIG. 28A, a functional block diagram of a first integrated circuit (IC) 2820 and a second IC 2850 connected to a third IC 2822. The third IC 2822 includes a PHY 2824 operating at first and second speeds (e.g. XGMII in a receive direction and MII in a transmit direction or vice versa). The first IC includes a 10GBase-R serializer 2840 on a transmit path of the MAC 2836 and a 10GBase-R deserializer 2830 on a receive path of the MAC 2836. The second IC 2850 includes an SGMII serializer 2852 on a transmit path from a MAC 2854 and an SGMII deserializer 2856 on a receive path to the MAC 2854. The MAC 2836 operates at high speed such as XGMII and the MAC 2854 operates at low speed such as MII. The third IC 2822 receives transmit data at high speed from one-half of the MAC 2836 in the first IC 2820 and sends low speed data to one-half of the MAC 2854 of the second IC 2850. As can be appreciated, the speed of the transmit path and the receive path can be reversed at the other end of the link segment as shown in FIG. 28B. The other paths in each of the first IC 2820 and second IC 2850 are unused. In some examples, the MACs in FIG. 28A are connected to the sensor or camera in a vehicle and the MACs in FIG. 28B are connected to the controller for the vehicle safety system, driver assistance system or autonomous control system.

Figure 29:
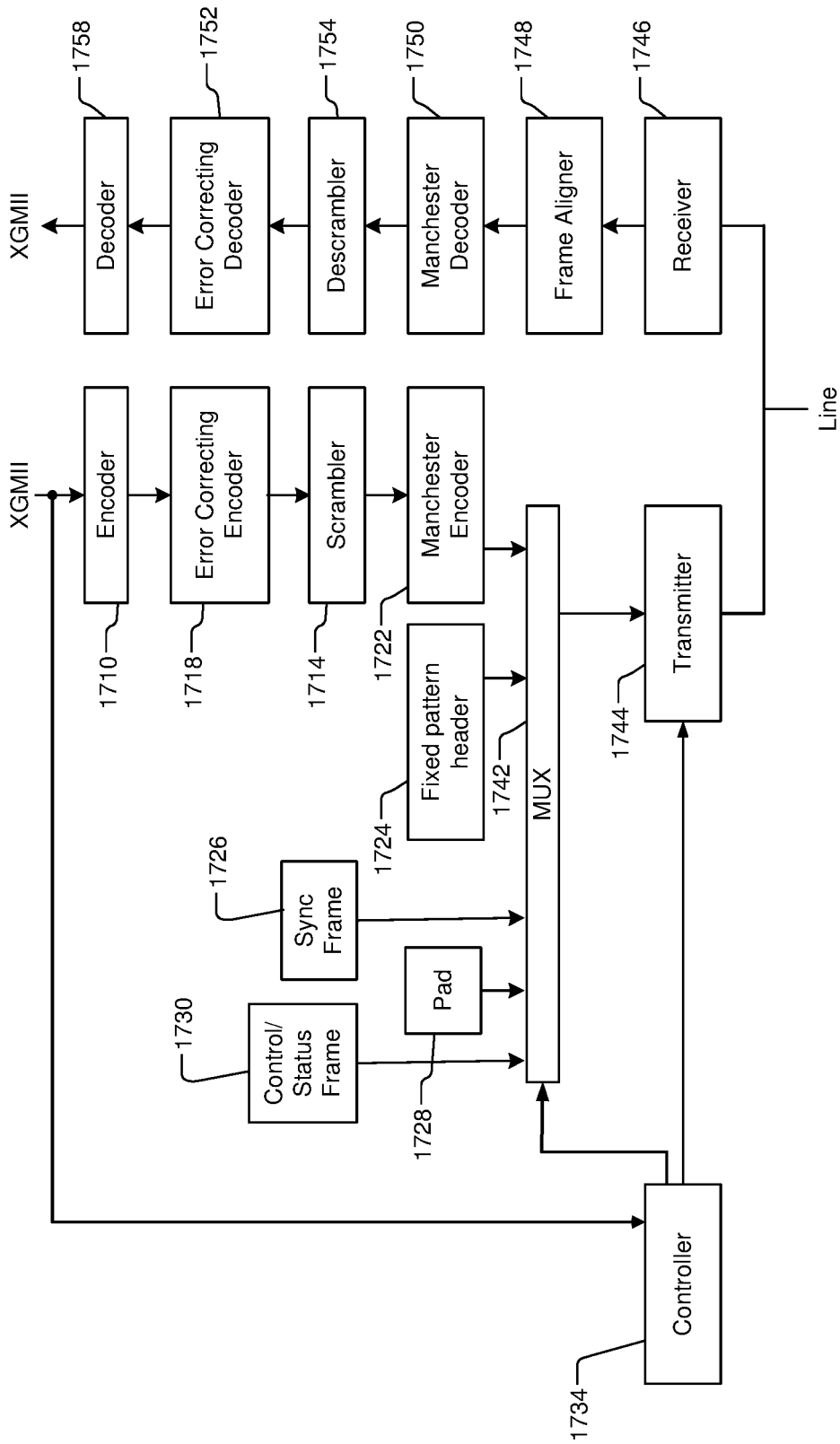
FIG. 29 is a functional block diagram of another example of a transmit path and a receive path according to the present disclosure.

Referring now to FIGS. 17B and 29, scrambling on the transmit and receive paths can be performed in another manner. In FIG. 17B, the data is scrambled, and parity is generated based on the scrambled data. In FIG. 29, the scrambler 1714 is located after the error correcting encoder 1718 in the transmit data path. As a result, the data and the parity are scrambled. On the receive path, the descrambler 1754 is located before the error correcting decoder 1752. As a result, the descrambler 1754 descrambles both the data and the parity.

Figure 30:
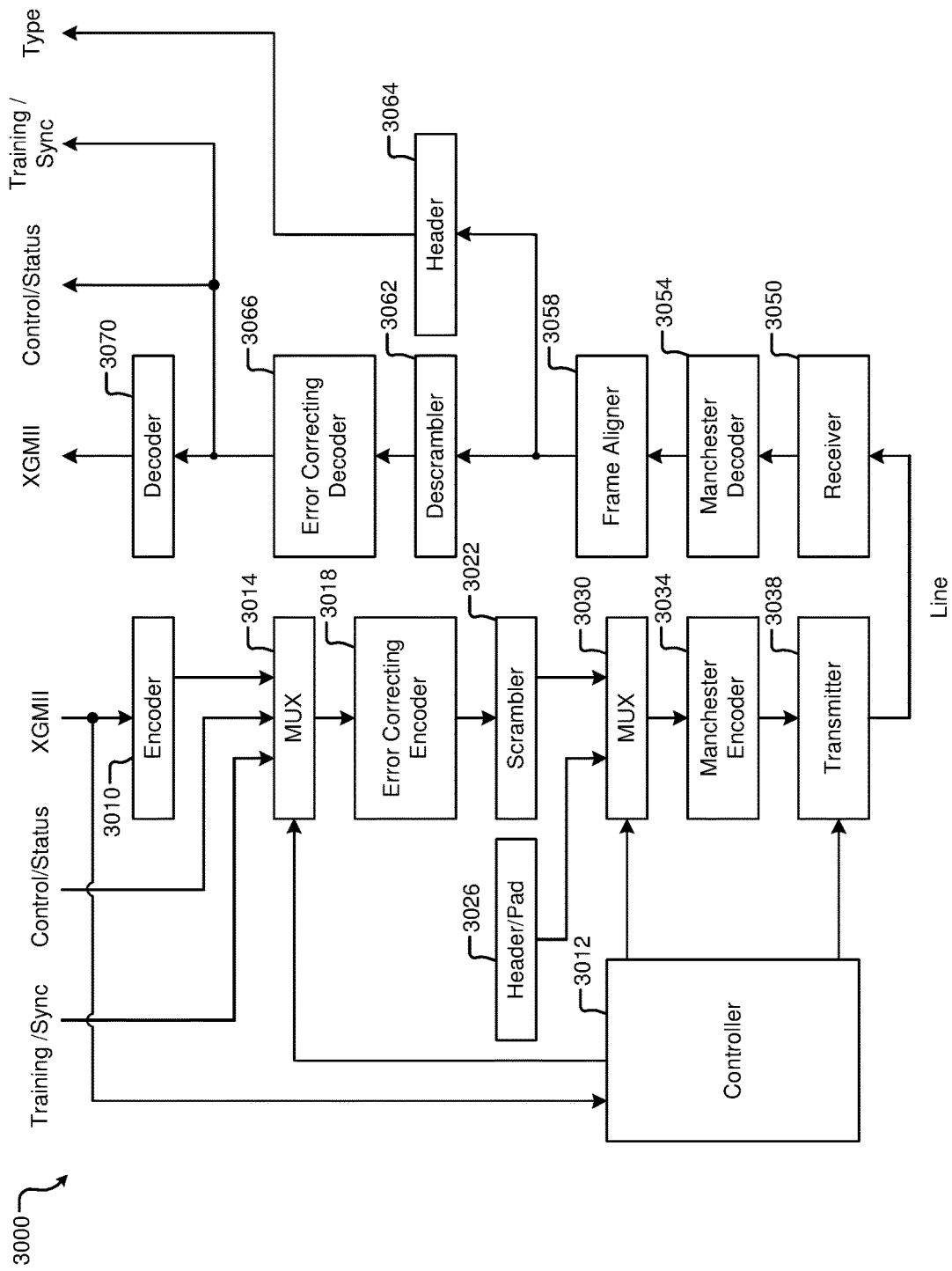
FIG. 30 is a functional block diagram of another example of a transmit path and a receive path according to the present disclosure.

Referring now to FIG. 30, another example of transmit and receive paths is shown. In this example, the training/sync data and control/status frame pass through an error correcting encoder and a scrambler. For the control/status frame, it enables error correction capability on the control/status information. The scrambling allows for reduced emissions by randomizing the same control/status codes that may be transmitted repeatedly. In some examples, the header/pad are also Manchester encoded.

On a transmit path, XGMII data is input to an encoder 3010 and to a controller 3012. An output of the encoder 3010 is input to a multiplexer 3014. The multiplexer 3014 also receives the training/sync data and the control/status frame. A state of the multiplexer 3014 is controlled by the controller 3012. An output of the multiplexer 3014 is input to an error correcting encoder 3018, which generates parity. An output of the error correcting encoder 3018 is input to a scrambler 3022, which scrambles the data and parity. An output of the scrambler 3022 is input to a multiplexer 3030 which also receives the header/pad 3026. A state of the multiplexer 3030 is likewise controlled by the controller 3012. An output on the multiplexer 3030 is input to a Manchester encoder 3034, which performs Manchester encoding. An output of the Manchester encoder 3034 is input to a transmitter 3038, which is connected to a line.

A receive path includes a receiver 3050 connected to the line. An output of the receiver 3050 is input to a Manchester decoder 3054. An output of the Manchester decoder 3054 is input to a frame aligner 3058, which aligns the frames. The frame aligner 3058 outputs a scrambled portion to a descrambler 3062 and the header 3064. An output of the descrambler 3062 is input to an error correcting decoder 3066, which uses the parity to correct errors. An output of the error correcting decoder 3066 includes data, the control/status frame, and training/sync data. A decoder 3070 decodes the data.

In some of the preceding examples, the frame includes 200 bits. In the description that follows, the frame is described as a 100-bit frame. As can be appreciated, both relate to the same example. The 100-bit frame relates to the data before Manchester encoding. After Manchester encoding, the frame becomes 200 bits. In the description below, the data will be discussed as 100-bit frames before Manchester encoding.

In the example in FIG. 17A, the header was defined by 14 bits followed by 85 bits of data and parity, and 1 bit of pad (there is no first pad bit). Unlike the description corresponding to FIG. 16, the entire 100-bit frame is Manchester encoded to form 200-bits. In other words, each of the bits in the 100-bit frame is expanded into a Manchester code that is 2 bits long.

As will be described further below, the change to make everything Manchester encoded will allow clock recovery, an alert signal and differentiate the type of data being received. The header pattern delineates whether the frame is a XGMII data, control/status, or training/sync. The patterns are sufficiently different so that one header is not mistaken for another in noisy environments.

Examples of suitable 14-bit patterns (before converting to Manchester) include:

| | |
|---|---|
| Training/sync | 11111111111110 |
| XGMII data | 00000000000001 |
| Control/Status | 10101010101011 |

The final pad bit can be a fixed value or a random value of 0 or 1. As will be described further below, the purpose of the pad bit is to electrically isolate the final data bit from electrical idle.

The training sequence can have several purposes. The training sequence can be used to establish a data bit boundary. The training sequence can optionally be used to establish clock recovery. The training sequence can be used to establish the frame alignment to the 100-bit frame boundary, recover the scrambler sequence at the descrambler and/or optionally send configuration information One possible way to format the 100-bit training/sync frame is training/sync header sequence (14 bits), 65 data bits consisting of 49 bits of 0s and 16 bits of configuration data, 20 bits of parity, and 1 pad bit. The data and parity bits are then scrambled. This 100-bits are converted to a Manchester sequence of +/−1 on the wire.

As shown in FIG. 16 and the corresponding description, every other Manchester bit position is a transition, and the other bit positions may or may not have a transition. The positions that always have the transition are called clock transitions, and the other positions are called data transitions. This information can be used to establish the data bit boundary.

The clock transitions contain timing information that can be used for clock recovery since they occur at a regular interval. The 100-bit frame boundary can be established by looking for the training/sync header pattern. Since the next 86 data bits are scrambled (or pad bit randomized), the header pattern will not consistently be found there though on occasion it may randomly have a sequence that matches the header pattern. Once the position is found that consistently has the sync/training header, the 100-bit frame boundary is determined.

Once the frame alignment is determined, the scrambler value can be recovered from the bit position of the 49 bits that are set to 0s. Since the scrambler XOR 0 is simply the scrambler value, the 49 bits is the scrambler sequence itself. Once the scrambler sequence is known, the descrambler can be initialized to the scrambler sequence and lock to the scrambler sequence.

After the frame alignment is determined and the descrambler is locked, the full training/sync frame can be processed by the Reed-Solomon correction circuit. The 16 bits of configuration data can be recovered with high reliability. Once training is complete, XGMII data frames and control/status data frames can be sent.

Figure 31:
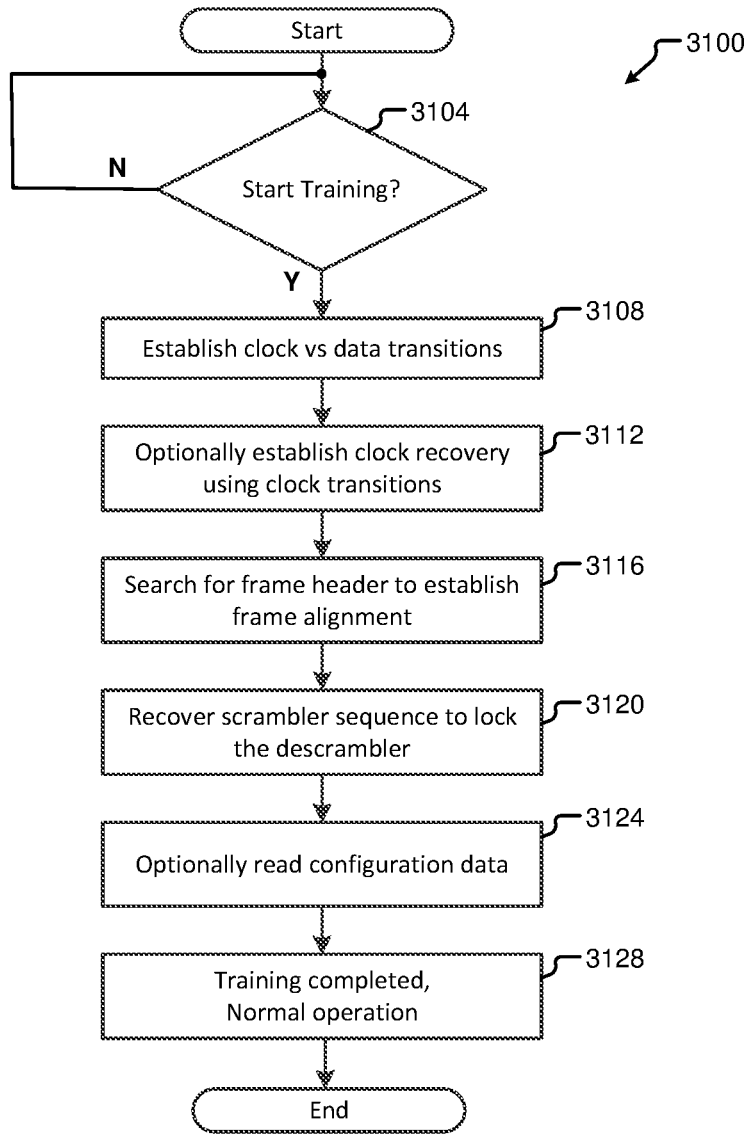
FIG. 31 is a flowchart of an example of a method for training according to the present disclosure.

Referring now to FIG. 31, a method 3100 for training is shown. At 3104, the method determines whether training should be started. If 3104 is true, the method establishes clock transitions versus data transitions at 3108. At 3112, clock recovery is optionally established using the clock transitions. At 3116, the method searches for a frame header to establish frame alignment. At 3120, the scrambler sequence is recovered to lock the scrambler. At 3124, the configuration data is optionally read. At 3128, training is completed, and normal operation begins.

Referring back to FIGS. 15 and 18-19, the master can have a fast transmit speed and the slave can have a slow transmit speed. The preceding discussion corresponding to FIGS. 18 and 19 applies to this case. The header can be used as an alert signal to let the receiver know that the data and parity will be arriving after the header. Since the Manchester signaling is turned on and off, the pad bit protects the final data bit from possible corruption when switching from electrical +/−1 to electrical 0.

Figure 32:
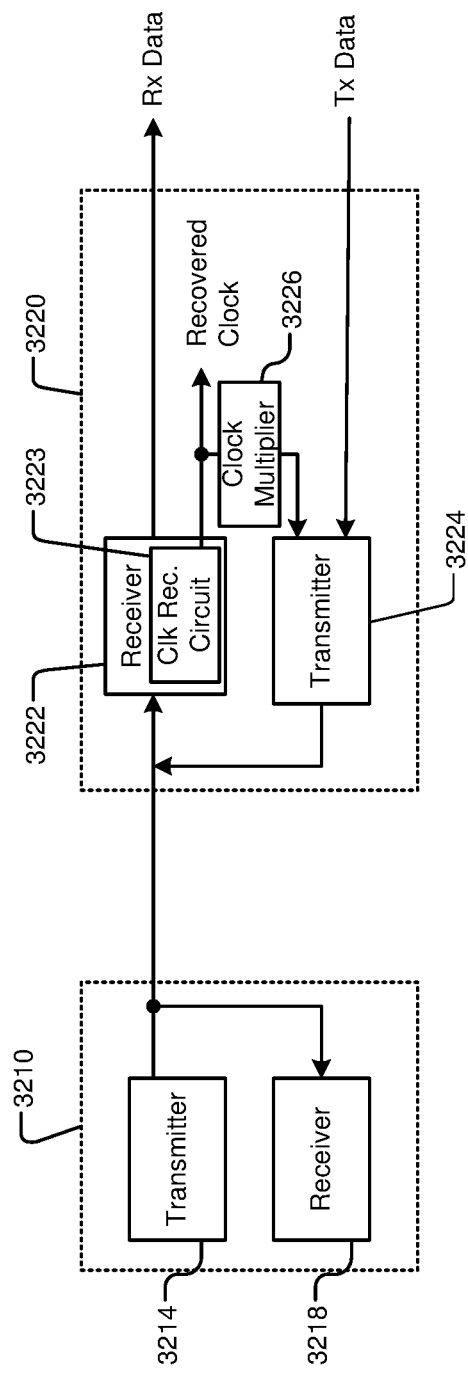
FIG. 32 is a functional block diagram of an example of master with slow transmit speed and a slave with fast transmit speed according to the present disclosure.

Referring now to FIGS. 21 and 32, the master can also have a slow transmit speed and the slave can have a fast transmit speed. In other words, FIG. 32 is the reverse of FIG. 15 and the slow recovered clock is multiplied to a faster clock. FIG. 32 corresponds to the links shown in FIG. 21. Instead of dividing by T, the recovered clock is multiplied by T as noted above in the description corresponding to FIG. 21. As further noted above, in some examples the frames continue to be sent to keep the clock frequency locked. In other words, the frames are not toggled on and off.

Figure 33:
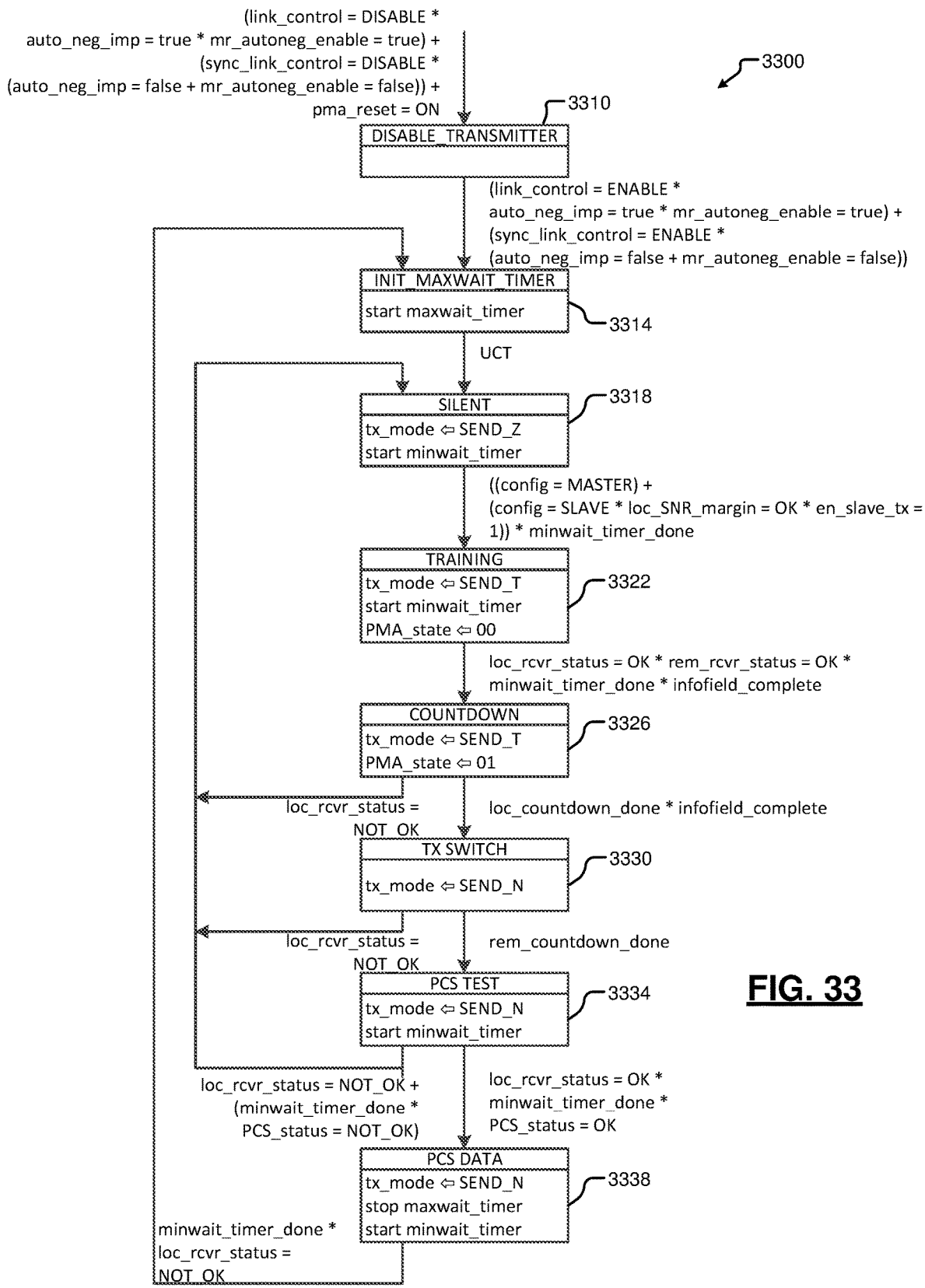
FIG. 33 is an example of a state diagram for initiating PCS data in synchronous mode according to the prior art.
Figure 34:
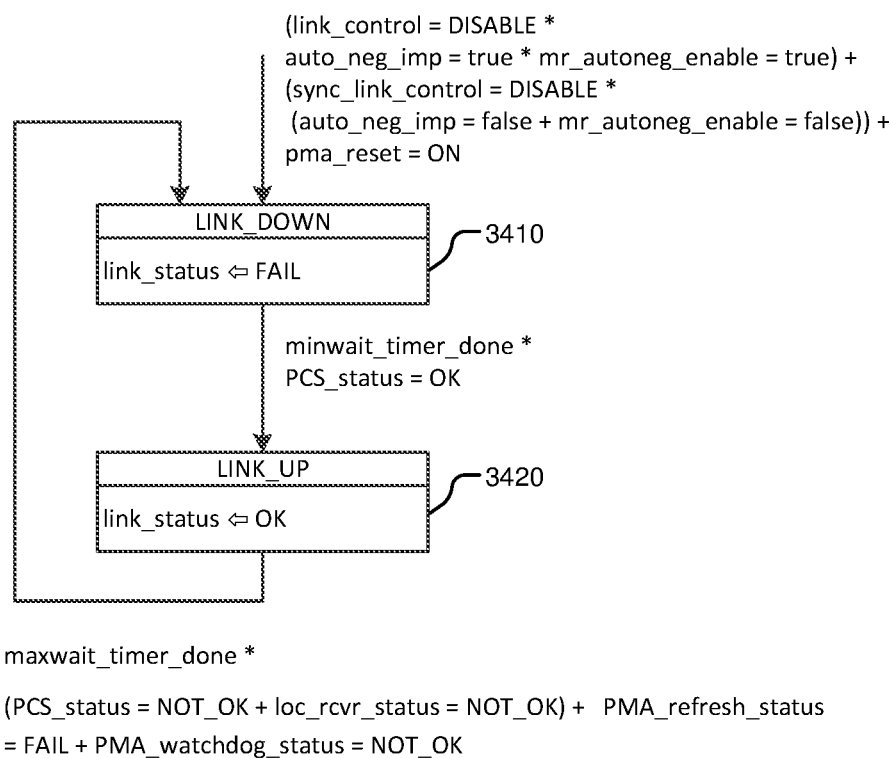
FIG. 34 is an example of a state diagram for link down and link up transitions according to the prior art.

In FIG. 27, one example of the transition from symmetric to asymmetric mode is shown. FIGS. 33 and 34 provide additional details describing how two PHYs enter training to link up in symmetrical mode. The detailed description can be found in IEEE P802.3ch Clause 149.4.4 and 149.4.5. Since the standard is in development, the state machines are subject to change. The state machines are provided for reference. A more mature version of the state diagrams can be found in IEEE P802.3 bp Clause 97.4.4 and 97.4.5. However, there are some differences between the 2 versions.

Briefly, the PHY transitions through states including a DISABLE_TRANMITTER state 3310, a INIT_MAX-WAIT_TIMER state 3314, a SILENT state 3318, a TRAINING state 3322, a COUNTDOWN state 3326, a TX-SWITCH state 3330, a PCS_TEST state 3334 and a PCS_DATA state 3338 as shown in FIG. 33. Conditions for transitioning to a next state or returning to a prior state are shown. Variables are set as shown inside of the state boxes 3318 to 3338. In FIG. 34, transitions to and from a LINK_DOWN state 3410 and a LINK_UP state 3420 are shown. As described above, the state diagrams in FIGS. 33 and 34 are used to establish the symmetric mode.

Figure 35:
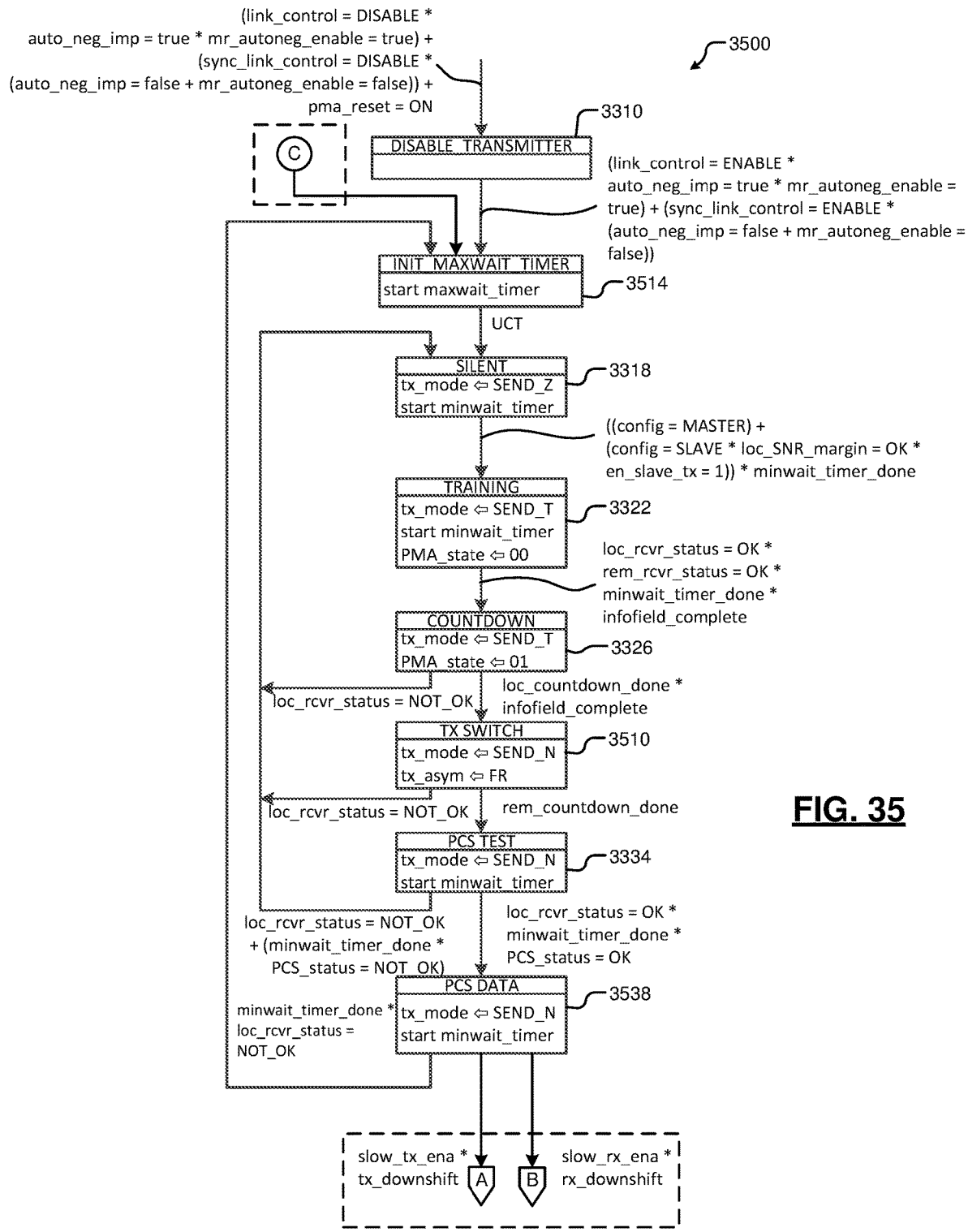
FIGS. 35-37 are examples of state diagrams for initiating PCS data in asynchronous mode according to the present disclosure.
Figures 36, 37:
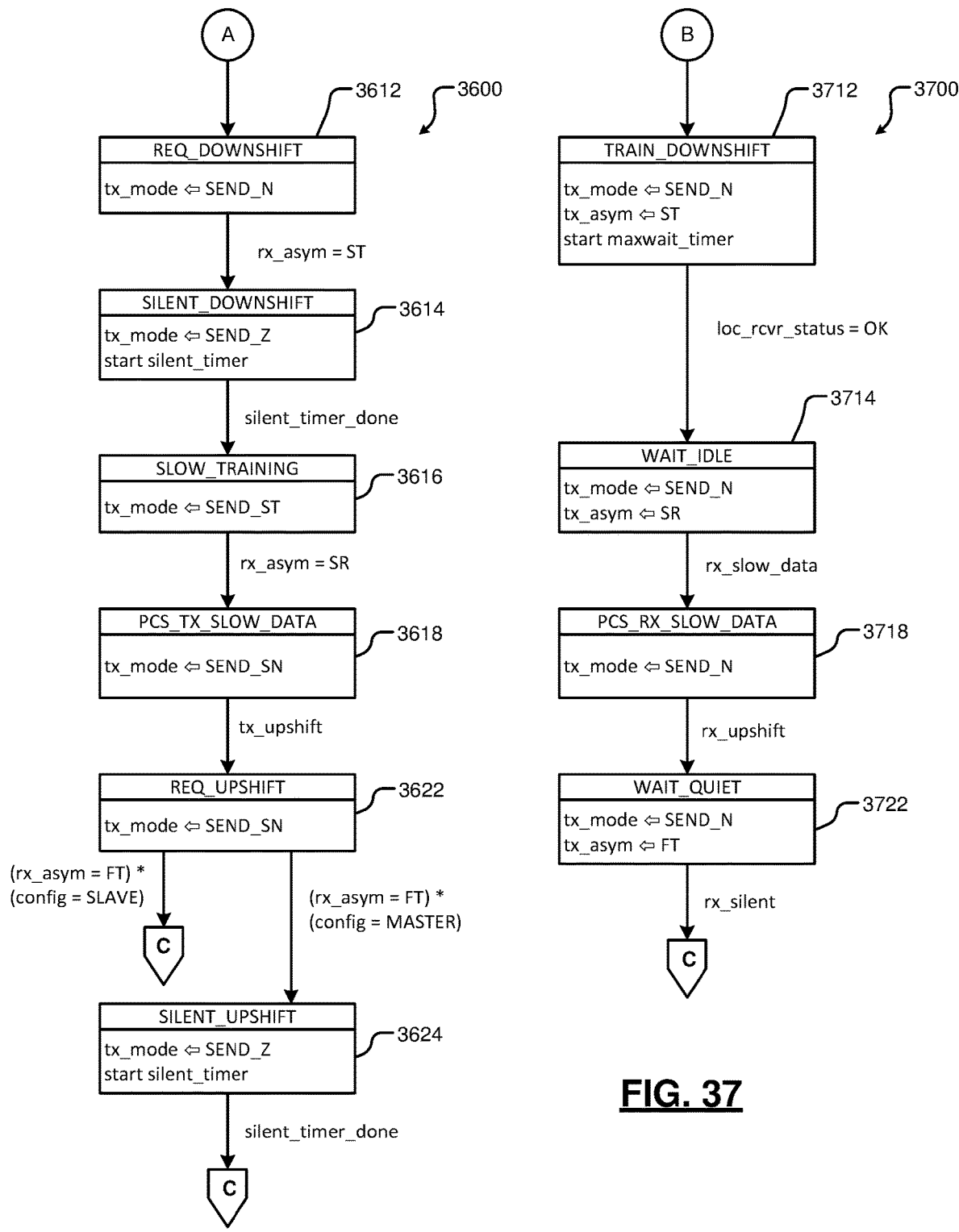

Referring now to FIGS. 35-37, the state diagram of FIG. 33 is modified in FIGS. 35-37 to allow asymmetric operation (the state diagram of FIG. 34 remains unchanged). Changes to the state diagram in FIG. 33 are discussed further below. The INIT_MAXWAIT_TIMER state 3514 has another entry point C (shown and described further in conjunction with FIGS. 36 and 37). A TX_SWITCH state 3530 additionally includes setting tx_asm equal to FR. A PCS data state 3538 further includes additional state transitions to A and B paths in response to slow_tx_ena*tx_downshift and slow_rx_ena*rx_downshift, respectively, (as shown and described further in FIGS. 36 and 37).

In FIG. 36, a state machine 3600 for the A path is shown to include a REQ_DOWNSHIFT state 3612, a SILENT_DOWNSHIFT state 3614, a SLOW_TRAINING state 3616, a PCS_TX_SLOW_DATA state 3618, a REQ_UPSHIFT state 3622, and a SILENT_UPSHIFT state 3624. The state machine 3600 transitions to the REQ_DOWNSHIFT state 3612 when slow_tx_ena*and tx_downshift are asserted. In the REQ_DOWNSHIFT state 3612, tx_mode⇐ SEND_N.

The state machine 3600 transitions from the REQ_DOWNSHIFT state 3612 to the SILENT_DOWNSHIFT state 3614 when rx_asym=ST. In the SILENT_DOWNSHIFT state 3614, tx_mode⇐ SEND_Z and the silent_timer is started. The state machine transitions from the SILENT_DOWNSHIFT state 3614 to the SLOW_TRAINING state 3616 when silent_timer_done is asserted. In the SLOW_TRAINING state 3616, tx_mode⇐ SEND_ST. The state machine transitions from the SLOW_TRAINING state 3616 to the PCS_TX_SLOW_DATA state 3618 when rx_asym=SR. In the PCS_TX_SLOW_DATA state 3618, tx_mode⇐ SEND_SN.

The state machine 3600 transitions from the PCS_TX_SLOW_DATA state 3618 to the REQ_UPSHIFT state 3622 when tx_upshift is asserted. The state machine 3600 transitions from the REQ_UPSHIFT state 3622 to path C in FIG. 35 when (rx_asym=FT)*(config=SLAVE). The state machine 3600 transitions from the REQ_UPSHIFT state 3622 to the SILENT_UPSHIFT state 3624 when (rx_asym=FT)*(config=MASTER). In the SILENT_UPSHIFT state 3624, tx_mode a SEND_Z and the silent_timer is started. The state machine 3600 transitions from the SILENT_UPSHIFT state 3624 to path C in FIG. 35 when silent_timer_done is asserted.

In FIG. 37, a state machine 3700 for the B path is shown to include a TRAIN_DOWNSHIFT state 3712, a WAIT_IDLE state 3714, a PCS_RX_SLOW_DATA state 3718 and a WAIT_QUIET state 3722. The state machine 3700 transitions into the TRAIN_DOWNSHIFT state 3712 when slow_rx_ena*rx_downshift are asserted. In the TRAIN_DOWNSHIFT state 3712, tx_mode a SEND_N, tx_asym⇐ ST, and the maxwait_timer is started.

The state machine 3700 transitions from the TRAIN_DOWNSHIFT state 3712 to the WAIT_IDLE state 3714 when loc_rcvr_status=OK. In the WAIT_IDLE state 3714, tx_mode⇐ SEND_N and tx_asym⇐ SR. The state machine 3700 transitions from the WAIT_IDLE state 3714 to the PCS_RX_SLOW_DATA state 3718 when rx_slow_data is asserted. In the PCS_RX_SLOW_DATA state 3718, tx_mode⇐ SEND_N.

The state machine 3700 transitions from PCS_RX_SLOW_DATA state 3718 to the WAIT_QUIET state 3722 when rx_upshift is asserted. In the WAIT_QUIET state 3722, tx_mode⇐ SEND_N and tx_asym⇐ FT. The state machine 3700 transitions from WAIT_QUIET state 3722 to path C in FIG. 35 when rx_silent is asserted.

The path from DISABLE_TRANSMITTER to PCS DATA is taken during normal training into synchronous operation and will not be described here. The path from INIT_MAXWAIT_TIMER to PCS DATA is taken when transitioning from asymmetric operation to symmetric operation.

The sequence of operations for downshifting are as follows. In this example, PHY S is slow transmitter (and fast receiver) and PHY F is the slow receiver (and fast transmitter). The MAC attached to PHY S initiates a downshift by sending a downshift sequence ordered set (DSOS) on the XGMII which triggers tx_downshift to be TRUE. PHY S transitions from PCS DATA state into REQ_DOWNSHIFT state and transmits DSOS to PHY F. PHY F receives the DSOS and transitions from the PCS DATA state into the TRAIN_DOWNSHIFT state when it is ready to downshift.

PHY F sents tx_asym=ST over OAM to PHY S. PHY S receives the ST status in rx_asym and transitions into the SILENT_DOWNSHIFT state. PHY S is silent for some time. PHY S starts to send the slow speed training/sync frames. PHY F trains on these frames. PHY F completes training and asserts the loc_rcvr_status=OK and moves to WAIT_IDLE state. PHY F sents tx_asym=SR over OAM to PHY S.

PHY S receives the SR status in rx_asym and transitions into the PCS_TX_SLOW_DATA state and proceeds to send data and control/status frames. This is the slow transmit speed state. PHY F sees data or control/status frames and in response asserts rx_slow_data. PHY F then enters into the PCS_RX_SLOW_DATA state. This is the slow receive speed state.

The sequence of operations for upshifting are as follows. The MAC attached to PHY S initiates a upshift by sending upshift sequence ordered set (UPOS) on the XGMII which triggers tx_upshift to be TRUE. PHY S transitions from PCS_TX_SLOW_DATA state into REQ_UPSHIFT state and transmits UPOS to PHY F.

PHY F receives the UPOS and transitions from the PCS_RX_SLOW_DATA state into the WAIT_QUIET state when it is ready to upshift. PHY F sents tx_asym=FT over OAM to PHY S. PHY S receives the FT status in rx_asym and transitions into the SILENT_UPSHIFT state if it is master. Otherwise PHY S transitions into the INIT_MAX-WAIT_TIMER and proceeds with training for symmetrical operation.

If PHY S is a master then it stays silent in the SILENT_UPSHIFT state until the silent_timer expires and then transitions into the INIT_MAXWAIT_TIMER state and proceeds with training for symmetrical operation. PHY S is silent for some time either in the SILENT_UPSHIFT state or in the SILENT state if it is master or slave respectively. PHY F detects the line is silent on the receiver and then transitions into the INIT_MAXWAIT_TIMER and proceeds with training for symmetrical operation.

Constants, Variables and Values

Only new and modified variables are described here. For all other variables refer to the IEEE P802.3ch standard. DSOS is the downshift sequence ordered set /Q/00/00/04/. UPOS is the upshift sequence ordered set /Q/00/00/05/.

The variable rx_asym corresponds to the state of the link partner receiver. This variable is received in the OAM frame in oam<0><5:4>. The value FR indicates that the link partner is ready to receive high speed data. The value FT indicates that the link partner is ready to enter high speed training mode. The value SR indicates that the link partner is ready to receive low speed data. The value ST indicates that the link partner is ready to enter low speed training mode.

The variable rx_downshift provides an indication that the link partner wants to enter low speed mode. This variable is TRUE if raw_rx=DSOS and the PHY is ready to downshift. When rx_downshift is FALSE, the PHY stays in high speed mode. When rx_downshift is TRUE, the PHY treats this as a request to transition to low speed mode.

The variable slow_rx_ena indicates the ability of the PHY to enter low speed receive mode. When slow_rx_ena is FALSE, the PHY does not advertise ability to receive in low speed mode or link partner does not advertise ability to transmit in low speed mode. When slow_rx_ena is TRUE, the PHY advertises the ability to receive in low speed mode and the link partner advertises the ability to transmit in low speed mode.

The variable rx_silent indicates whether the line is silent at the receiver. When rx_silent is FALSE, the line is not silent. When rx_silent is TRUE, the line is silent at the receiver.

The variable rx_slow_data provides an indication that the link partner is starting to send slow speed data and control frames. When rx_slow_data is TRUE, the link partner is starting to send slow speed data and control frames (rx_slow_data is TRUE when rx_SF<13:0> is a data or control/status header). When rx_slow_data is FALSE, the link partner is not starting to send slow speed data and control frames (rx_slow_data is FALSE when rx_SF<13:0> is not a data or control/status header).

The variable rx_upshift provides a receive indication that link partner wants to enter high speed mode. The variable rx_upshift is TRUE if raw_rx=UPOS and the PHY is ready to upshift. When the variable rx_upshift is FALSE, the PHY stays in low speed mode. When the variable rx_upshift is TRUE, this corresponds to a request to transition to high speed mode.

The variable slow_tx_ena indicates the ability of the PHY to enter low speed transmit mode. When FALSE, the PHY does not advertise its ability to transmit in low speed mode or link partner does not advertise its ability to receive in low speed mode. When TRUE, the PHY advertises its ability to transmit in low speed mode and link partner advertises its ability to receive in low speed mode.

The variable tx_asym indicates the state of the PHY receiver. This variable is transmitted in the OAM frame in oam<0><5:4>. When the variable tx_asym is equal to FR, the PHY receiver is ready to receive high speed data. When the variable tx_asym is equal to FT, the PHY receiver is ready to enter high speed training mode. When the variable tx_asym is equal to SR, the PHY receiver is ready to receive low speed data. When the variable tx_asym is equal to ST, the PHY receiver is ready to enter low speed training mode.

The variable tx_downshift is a receive indication that the PHY should enter low speed mode. This variable is TRUE if raw_tx=DSOS. When the variable tx_downshift is FALSE, the PHY stays in high speed mode. When the variable tx_downshift is TRUE, the PHY initiates transition to low speed mode.

The variable tx_mode is continuously generated by the PMA and passed to the PCS via the PMA_TXMODE.indication primitive. The value SEND_N is continuously asserted when transmission of sequences of symbols representing a XGMII data stream in high speed mode take place. The value SEND_SN is continuously asserted when transmission of sequences of symbols representing a XGMII data stream in low speed mode take place. The value SEND_ST is continuously asserted when transmission of sequences of symbols of low speed mode representing the training sequences of symbols is to take place. The value SEND_T is continuously asserted when transmission of sequences of symbols of high-speed mode representing the training sequences of symbols is to take place. The value SEND_Z is continuously asserted when transmission of zero symbols is to take place.

The variable tx_upshift is a receive indication that PHY should enter high speed mode. This variable is TRUE if raw_tx=UPOS. When the variable tx_upshift is FALSE, the PHY stays in low speed mode. When the variable tx_upshift is TRUE, the PHY initiates transition to high speed mode.

A silent_timer defines a silent duration when transitioning between high speed and low speed modes.

Figure 38:
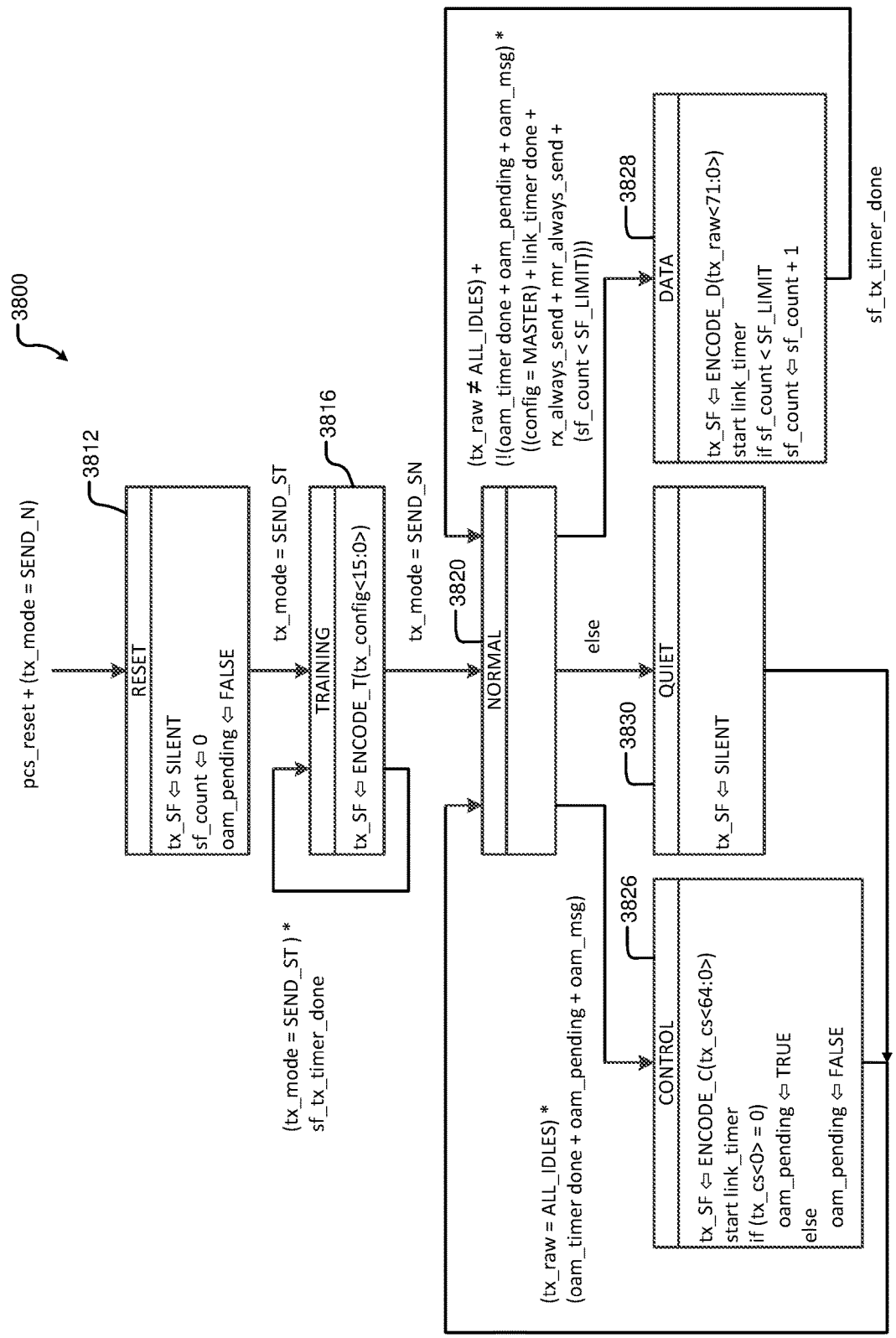
FIGS. 38 and 39 are examples of state diagrams for power saving modes according to the present disclosure.
Figure 39:
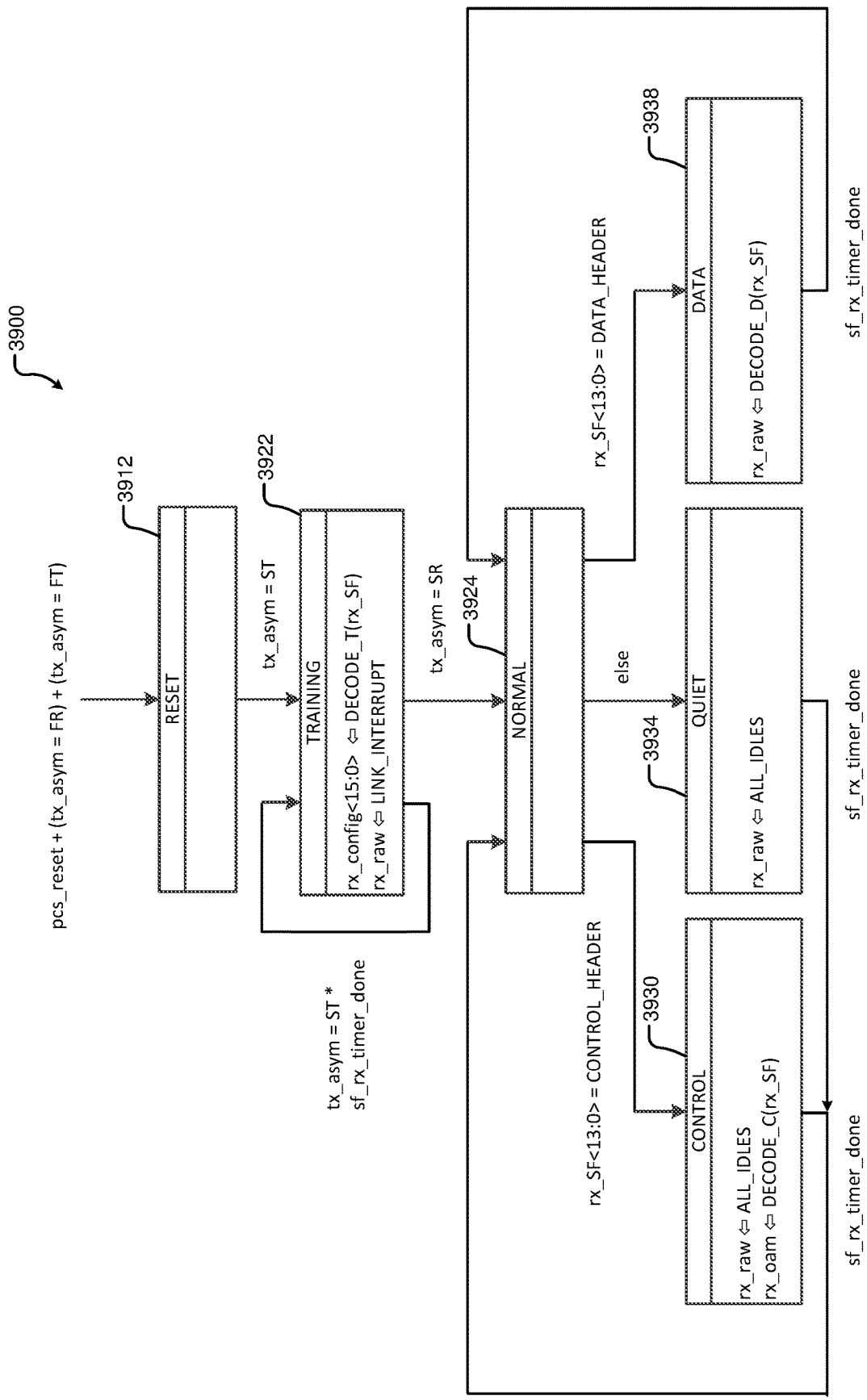

Referring now to FIGS. 38 and 39, additional details relating to power saving modes are shown. In FIG. 17C and FIG. 18 and the corresponding description, the transmitter saves power by not transmitting when there is no data to transmit. The state machines in FIGS. 38 and 39 expand on the concepts in FIG. 17C.

In FIG. 38, low speed transmitter operation is shown. A state machine 3800 transitions between a RESET state 3812, a TRAINING state 3816, a NORMAL state 3820, a CONTROL state 3826, a QUIET state 3830 and a DATA state 3828. The state machine 3800 transitions to the RESET state 3812 when pcs_reset+(tx_mode=SEND_N). In the RESET state 3812, tx_SF⇐ SILENT, sf_count⇐ 0, and oam_pending⇐ FALSE. The state machine transitions from the RESET state 3812 to the TRAINING state 3816 when tx_mode=SEND_ST. In the TRAINING state 3816, tx_SF ⇐ ENCODE_T(tx_config<15:0>).

The state machine 3800 transitions from the TRAINING state 3816 to the NORMAL state 3820 when tx_mode=SEND_SN. The state machine 3800 transitions from the NORMAL state 3820 to the CONTROL state 3826 when (tx_raw=ALL_IDLES)*(oam_timer done+ oam_pending+oam_msg). In the CONTROL state 3826, tx_SF⇐ ENCODE_C(tx_cs<64:0>), the link_timer is started, and if (tx_cs<0>=0) then oam_pending ⇐ TRUE else oam_pending a FALSE. The state machine 3800 transitions back to the NORMAL state 3820 when sf_tx_timer_done.

The state machine 3800 transitions from the NORMAL state 3820 to the DATA state 3828 when (tx_raw≠ALL_IDLES)+(!(oam_timer done+oam_pending+oam_msg)* ((config=MASTER)+link_timer done+rx_always_send+ mr_always_send+(sf_count<SF_LIMIT))). In the DATA state 3828, tx_SF ⇐ ENCODE_D(tx_raw<71:0>), the link_timer is started, and if sf_count<SF_LIMIT then sf_count ⇐ sf_count+1. The state machine 3800 transitions back to the NORMAL state 3820 when sf_tx_timer_done.

The state machine 3800 transitions from the NORMAL state 3820 to the QUIET state 3830 when the conditions for the CONTROL state 3826 and the DATA state 3828 are not met. In the QUIET state 3830, tx_SF⇐ SILENT. The state machine 3800 transitions back to the NORMAL state 3820 when sf_tx_timer_done.

In FIG. 39, low speed receiver operation is shown. A state machine 3900 transitions between a RESET state 3912, a TRAINING state 3922, a NORMAL state 3924, a CONTROL state 3930, a QUIET state 3934 and a DATA state 3938. The state machine 3900 transitions to the RESET state 3912 when pcs_reset+(tx_asym=FR)+(tx_asym=FT).

The state machine 3900 transitions from the RESET state 3912 to the TRAINING state 3922 when tx_asym=ST. In the TRAINING state 3922, rx_config<15:0>⇐ DECODE_T (rx_SF) and rx_raw⇐ LINK_INTERRUPT. The TRAINING state 3922 transitions back to the TRAINING state 3922 when tx_asm=ST*sf_rx_timer_done.

The state machine 3900 transitions from the TRAINING state 3922 to the NORMAL state 3924 when tx_asym=SR. The state machine 3900 transitions from the NORMAL state 3924 to the CONTROL state 3930 when rx_SF<13: 0>=CONTROL_HEADER. In the CONTROL state 3930, rx_raw⇐ ALL_IDLES and rx_oam⇐ DECODE_C(rx_SF).

The state machine 3900 transitions back to the NORMAL state 3824 when sf_tx_timer_done.

The state machine 3900 transitions from the NORMAL state 3924 to the DATA state 3930 when rx_SF<13: 0>=DATA HEADER. The state machine 3900 transitions back to the NORMAL state 3924 when sf_tx_timer_done. The state machine 3900 transitions from the NORMAL state 3924 to the QUIET state 3830 when the conditions for the CONTROL state 3930 and the DATA state 3938 are not met. In the QUIET state 3934, rx_raw⇐ ALL_IDLES. The state machine 3900 transitions back to the NORMAL state 3924 when sf_tx_timer_done.

When the slow transmitter is operating as the slave, some 100-bit frames can optionally be sent as electrical idles (0V on the MDI) instead of +1, −1 to save power. The following rules specify when a 100-bit frame shall be sent. If none of the rules are met then electrical idles shall be sent during the 100-bit frame period.

The following description summarizes the low speed transmitter operation. In some examples, something is transmitted for items 1 to 7, and electrical zero is sent in item 8.
 1. Slow transmitter operating as master (config=MASTER);
 2. Register TBD disabling transmission of electrical idles (mr_always_send=TRUE);
 3. Link partners OAM TBD bits=TBD requesting PHY not to transmit electrical idles (rx_always_send=TRUE);
 4. 64/65 frame does not have all idle symbols (tx_raw ? ALL_IDLES);
 5. An OAM message is pending and has not been completed (oam_msg=TRUE);
 6. An OAM frame is partially transmitted (oam_pending=TRUE);
 7. An OAM frame scheduled to be exchanged. (oam_timer_done); and
 8. Nothing has been transmitted in TBD ms. (link_timer_done)

The low speed receiver operation decodes based on the headers and places the data in the appropriate variables (rx_raw, rx_config, rx_oam).

Constants, Variables, Functions, Timers and Values

Variables are defined below except for those already defined in IEEE P802.3ch. All idle symbols (ALL_IDLES) consisting of /I/I/I/I/ /I/I/I/I/. CONTROL_HEADER is a 14 bit header representing data frame with value of 0x3555 where the LSB is transmitted first. DATA_HEADER is a 14 bit header representing data frame with value of 0x2000 where the LSB is transmitted first. LINK_INTERRUPT is a sequence ordered set consisting of /Q/00/00/03/. SF_LIMIT correspond to the number of 100-bit data frames that must be transmitted when transitioning into low speed mode. SILENT is a logic state indicating electrical zero. TRAINING_HEADER is a 14 bit header representing training/sync frame with value of 0x1FFF where the LSB is transmitted first.

The variable mr_always_send is an indicator from the PHY on whether to allow the line to go quiet. When the variable mr_always_send is FALSE, the line is allowed to periodically go quiet when there is no data to transmit. When the variable mr_always_send is TRUE, 100-bit frames are always sent.

The variable oam_msg is set TRUE if an OAM message is pending. The variable oam_msg self clears once the complete OAM frame with the message is passed to the ENCODE_C function. When the variable oam_msg is FALSE, no OAM message is pending. When the variable oam_msg is TRUE, an OAM message is pending in the queue.

The variable oam_pending track whether or not the complete OAM frame has been transmitted. The variable oam_pending is FALSE when nothing is pending. The variable oam_pending is TRUE when a partial portion of the OAM frame has been transmitted.

The variable rx_always_send is an indicator from the link partner on whether to allow the line to go quiet. When the variable rx_always_send is FALSE, the line is allowed to periodically go quiet when there is no data to transmit. When the variable rx_always_send is TRUE, 100-bit frames are always sent.

The variable rx_config<15:0> is a configuration sent by the link partner during slow speed training.

The variable rx_SF<99:0> indicates that a 100-bit frame was received. Each of the 100 bits can assume a value of 0, 1, or SILENT. When the variable rx_SF<99:0> is 0, the bit is a logic 0. When the variable rx_SF<99:0> is 1, the bit is a logic 1. When the variable rx_SF<99:0> is SILENT, the bit state is an electrical zero. Either all 100 bits are all SILENT or none of the 100 bits are SILENT.

The variable tx_config<15:0> corresponds to a configuration sent by the PHY to the link partner during slow speed training.

The following relates to variable tx_cs<64:0>. The tx_oam is packed onto tx_cs to be transmitted. The tx_cs alternates to pack the lower and upper tx_oam. For the lower section, tx_cs<0>=0 and tx_cs<8n+8:8n+1>=tx_oam<n><7:0> where n=0 to 7. For the upper section, tx_cs<0>=1 and tx_cs<8n+8:8n+1>=OAM<n+8><7:0> where n=0 to 5 and tx_cs<64:49>=0x0000.

For the variable tx_SF<99:0>, the 100-bit frame to be transmitted. Each of the 100 bits can assume a value of 0, 1, or SILENT. The values can be logic 0, logic 1 or SILENT. SILENT is a state indicating to the PMA that electrical zero should be sent. Either all 100 bits are all SILENT or none of the 100 bits are SILENT.

The link_timer is a timer used in low speed mode to prevent the line from being quiet for too long. The link_timer is reset whenever a 100-bit data frame or control/status frame is sent. When the link_timer expires a 100-bit data frame is transmitted. The period of the timer may be set to a predetermined period.

The oam_timer is a free running timer used in low speed mode that triggers and resets periodically. Once triggered an OAM frame is scheduled for transmission. The period of the timer may be set to a predetermined period.

The sf_rx_timer continuously triggers and resets once over the duration of the 100-bit frame. The triggering coincides with the rx_SF frame boundary. The sf_tx_timer continuously triggers and resets once over the duration of the 100-bit frame. The triggering coincides with the tx_SF frame boundary. The sf_count is a counter used to enforce minimum number of 100-bit frames are sent after entering low speed mode.

ENCODE_C(tx_cs<64:0>) is a function that encapsulates tx_cs<64:0> into a 100-bit control/status frame. The ENCODE_D(tx_raw<71:0>) function encapsulates tx_raw<71:0> into a 100-bit control/status frame. The ENCODE_T(tx_config<15:0>) function encapsulates tx_config<15:0> into a 100-bit training/sync frame.

The DECODE_C(rx_SF) function decodes control/status frame to rx_oam. If rx_SF<14>=0 then the 64 bit decoded data is presented to rx_oam<7:0><7:0> else the 64 bit decoded data is presented to rx_oam<15:8><7:0>. The DECODE_D(rx_SF) function decodes data frame and present to rx_raw<71:0>.

The DECODE_T(rx_SF) function decodes the training/sync frame and present to rx_config<15:0>. If rx_SF<13:0>? TRAINING_HEADER then nothing will be presented to rx_config<15:0>.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A physical layer device for transmitting and receiving data, comprising:
    a transmit path including a first transmitter configured to operate at a first speed, communicate with a first medium access controller (MAC), and transmit first data from the MAC on a cable; and
    a receive path including a first receiver configured to operate at a second speed that is different than the first speed, communicate with the first MAC, and receive second data from the cable and output the second data to the first MAC,
    wherein the first receiver includes a clock recovery circuit configured to generate a recovered clock signal and wherein the first transmitter operates based on a ratio times the recovered clock signal, wherein the ratio is equal to the first speed divided by the second speed.

2. The physical layer device of claim 1, wherein the first speed is greater than or equal to two times the second speed.

3. The physical layer device of claim 1, wherein the first speed is less than or equal to one half of the second speed.

4. The physical layer device of claim 1, wherein the first transmitter is configured to transmit the first data in a first frequency range and wherein the first receiver is configured to receive the second data in a second frequency range that is different than the first frequency range.

5. The physical layer device of claim 4, further comprising:
    a first filter configured to pass the first frequency range and connected between the transmit path and the cable; and
    a second filter configured to pass the second frequency range and connected between the receiver path and the cable.

6. The physical layer device of claim 5, wherein the first filter is selected from a group consisting of a high pass filter and a first band pass filter, and wherein the second filter is selected from a group consisting of a low pass filter and a second band pass filter.

7. A system comprising:
    the physical layer device of claim 1;
    a low pass filter connected to the cable; and
    a data generating device connected to the physical layer device and the low pass filter.

8. A system comprising:
the physical layer device of claim 1;
a low pass filter connected to the cable; and
a power supply connected to the low pass filter.

9. A network interface for transmitting and receiving data, comprising:
a medium access controller (MAC) configured to receive first data in a first direction at a first speed and to transmit second data in a second direction at a second speed;
a physical layer device configured to output the first data to the MAC and to receive the second data from the MAC,
wherein the first speed is less than or equal to one half of the second speed;
a replicating circuit configured to replicate the first data at the first speed by a ratio of the second speed over the first speed to generate replicated first data at the second speed; and
a downsampling circuit configured to receive the replicated first data at the second speed, to downsample the replicated first data to recover and output the first data at the first speed to the MAC.

10. The network interface of claim 9, wherein the MAC is compliant with IEEE 802.3.

11. The network interface of claim 9, wherein the first data at the first speed comprises MII data and the second data at the second speed comprises XGMII data.

12. A network interface for transmitting and receiving data, comprising:
a medium access controller (MAC) configured to receive first data in a first direction at a first speed and to transmit second data in a second direction at a second speed;
a physical layer device configured to output the first data to the MAC and to receive the second data from the MAC,
wherein the first speed is different than the second speed;
a first serializer configured to serialize the first data from the PHY to provide first serialized data;
a first deserializer configured to deserialize the first serialized data from the first serializer and to output the first data at the first speed to the MAC;
a second serializer configured to serialize the second data from the MAC to provide second serialized data; and
a second deserializer configured to deserialize the second serialized data from the second serializer and to output the second data at the second speed to the PHY.

13. The network interface of claim 12, wherein:
the second serializer and the second deserializer use one of 10GBASE-R, 5GBASE-R, and 2.5GBASE-X; and
the first serializer and the first deserializer use SGMII in one of 1000 Mb/s, 100 Mb/s, and 10 Mb/s.

\* \* \* \* \*